(12) United States Patent
Hou et al.

(10) Patent No.: US 11,692,426 B2
(45) Date of Patent: Jul. 4, 2023

(54) METHOD AND APPARATUS FOR DETERMINING INTEGRATED EXPLOITATION APPROACH OF SHALE AND ADJACENT OIL RESERVOIRS

(71) Applicant: PetroChina Company Limited, Beijing (CN)

(72) Inventors: Lianhua Hou, Beijing (CN); Jinghong Wang, Beijing (CN); Weijie Hou, Beijing (CN); Ziyun Zhang, Beijing (CN); Futai Jing, Beijing (CN)

(73) Assignee: PetroChina Company Limited, Beijing (CN)

( * ) Notice: Subject to any disclaimer, the term of this patent is extended or adjusted under 35 U.S.C. 154(b) by 122 days.

(21) Appl. No.: 17/253,457

(22) PCT Filed: Feb. 24, 2020

(86) PCT No.: PCT/CN2020/076345
§ 371 (c)(1),
(2) Date: Dec. 17, 2020

(87) PCT Pub. No.: WO2021/031543
PCT Pub. Date: Feb. 25, 2021

(65) Prior Publication Data
US 2021/0372280 A1 Dec. 2, 2021

(30) Foreign Application Priority Data
Aug. 19, 2019 (CN) .......................... 201910762449.4

(51) Int. Cl.
*E21B 43/30* (2006.01)
*E21B 43/16* (2006.01)
(Continued)

(52) U.S. Cl.
CPC ............ *E21B 43/30* (2013.01); *E21B 43/168* (2013.01); *E21B 47/09* (2013.01); *E21B 49/00* (2013.01); *G01V 11/00* (2013.01)

(58) Field of Classification Search
CPC .......... E21B 49/00; E21B 47/09; E21B 43/30; E21B 43/168; G01V 11/00
See application file for complete search history.

(56) References Cited

U.S. PATENT DOCUMENTS 6,708,764 B2 * 3/2004 Zupanick ............ E21B 41/0064
166/50
2003/0192693 A1 10/2003 Wellington
(Continued)

FOREIGN PATENT DOCUMENTS

CN 103266874 A 8/2013
CN 102930345 B 11/2015
(Continued)

OTHER PUBLICATIONS

Extended European Search Report dated Jul. 22, 2021 for counterpart European patent application No. 20803734.1.
(Continued)

*Primary Examiner* — D. Andrews
(74) *Attorney, Agent, or Firm* — Young Basile Hanlon & MacFarlane, P.C.

(57) ABSTRACT

The invention provides a method and an apparatus for determining an integrated exploitation approach for a shale and adjacent oil reservoirs. The method includes: determining a thickness of an effective shale, a top effective boundary and a bottom effective boundary of adjacent effective oil reservoirs; determining a maximum seepage radius of each of the adjacent effective oil reservoirs to the effective shale; determining a well pattern; determining a well completion approach; and determining a total number of perforation clusters of gas injection wells, a number of perforation
(Continued)

clusters corresponding to each of the adjacent effective oil reservoirs, a gas injection amount per unit time of each of the perforation clusters, and a total gas injection amount per unit time of the gas injection wells. The effective shale is in communication with all the adjacent effective oil reservoirs by boring-through of a fluctuating horizontal well or a vertical well.

20 Claims, 8 Drawing Sheets

(51) Int. Cl.
    *E21B 49/00* (2006.01)
    *G01V 11/00* (2006.01)
    *E21B 47/09* (2012.01)

(56) References Cited

U.S. PATENT DOCUMENTS

| | | | |
|---|---|---|---|
| 2008/0087427 A1 | 4/2008 | Kaminsky et al. | |
| 2010/0071897 A1* | 3/2010 | Liu | E21B 43/00 166/250.01 |
| 2011/0272153 A1* | 11/2011 | Boone | E21B 43/26 166/52 |
| 2020/0018145 A1 | 1/2020 | Hou et al. | |
| 2021/0372280 A1 | 12/2021 | Hou et al. | |

FOREIGN PATENT DOCUMENTS

| | | |
|---|---|---|
| CN | 105930604 A | 9/2016 |
| CN | 106437629 A | 2/2017 |
| CN | 106761631 A | 5/2017 |
| CN | 108019195 A | 5/2018 |
| CN | 106321057 B | 10/2018 |
| CN | 109025982 A | 12/2018 |
| CN | 109102182 A | 12/2018 |
| CN | 109113699 A | 1/2019 |
| CN | 109441422 A | 3/2019 |
| CN | 109519158 A | 3/2019 |
| CN | 110005390 A | 7/2019 |
| EP | 2884043 A2 | 6/2015 |
| EP | 3800324 A1 | 4/2021 |
| RU | 2530146 C1 | 10/2014 |
| RU | 2612060 C1 | 3/2017 |
| RU | 2692369 C1 | 6/2019 |
| WO | 2021031543 A1 | 2/2021 |

OTHER PUBLICATIONS

Caizhen et al., Reasonable Development Method and Well Type Selection of Shale Gas Reservoir, Reservoir Evaluation and Development, vol. 6, No. 6, Dec. 2016.

Shaofen et al., Production Characteristics and Development Modes of Shale-Gas Wells, Changning Gasfield, Sichuan Basin, Natural Gas Exploration and Development, vol. 4, No. 1, 2018.

International Search Report issued for counterpart Chinese Patent App. No. PCT/CN2020/076345, dated May 12, 2020.

Beijing Sanyou Intellectual Property Agency Co., Ltd., Chinese Patent Novelty Search Report with English Translation for Method for Determining Integrated Development Method of Shale and Adjacent Oil Layer, Dated Aug. 7, 2019.

First Office Action and search report dated Jan. 27, 2022 for counterpart Canadian patent application No. 3,100,041.

* cited by examiner

METHOD AND APPARATUS FOR DETERMINING INTEGRATED EXPLOITATION APPROACH OF SHALE AND ADJACENT OIL RESERVOIRS

CROSS-REFERENCE TO RELATED APPLICATIONS

This application is a National Stage of International Application No. PCT/CN2020/076345, filed Feb. 24, 2020, which claims priority of Chinese Patent Application No. 201910762449.4, filed on Aug. 19, 2019, entitled "Method and Apparatus for Determining Integrated Exploitation Approach of Shale and Adjacent Oil Reservoirs", the entire contents of which are incorporated herein by reference.

TECHNICAL FIELD

This disclosure relates to the technical field of oil and gas exploration and exploitation, and in particular to a method and apparatus for determining an integrated exploitation approach for a shale and adjacent oil reservoirs.

BACKGROUND

Shale oil and gas has become an important area of oil and gas exploration and exploitation in the world. However, in the practice of the exploration and exploitation, it has proved that when a vitrinite reflectance (Ro) of an organic matter-rich shale is less than 0.95%, it is impossible to achieve large-scale exploitation with the existing horizontal well volume fracturing technique. As the level of thermal evolution of the shale with low to medium maturity is not high, the porosity in shale is not well-developed, and flow of fluid is made difficult, which makes it impossible to achieve exploitation with the existing horizontal well volume fracturing technique. The shale with low to medium maturity contains some generated oil and gas and unconverted organic matters, and thus can be exploited by using an in-situ conversion technique. Usually, the shale with low to medium maturity has lots of oil reservoirs in its adjacent reservoirs, and these oil reservoirs, which are generally compact due to their sedimentary environment, have interlayers therebetween, resulting in a poor continuity of oil reservoirs in a longitudinal direction. When using the existing horizontal well volume reconstruction technique, the recovery ratio is very low (generally less than 10%), and a large amount of oil remains in the reservoir and cannot be effectively exploitered.

It is roughly estimated that globally, recoverable oil resource that can be exploited from the organic matter-rich shale with low to medium maturity by using the in-situ conversion technique amounts to about 1.4 trillion tons, and recoverable gas resource amounts to about 1,100 trillion cubic meters. While in China, recoverable oil resource that can be exploited from shale with low to medium maturity by using the in-situ conversion technique amounts to about 70-90 billion tons, and recoverable gas resource amounts to about 57-65 trillion cubic meters. These figures are more than 3 times of the recoverable resource that can be exploited by using conventional oil and natural gas technologies. The recoverable petroleum resource that can be exploited from the adjacent oil reservoirs is equivalent to the recoverable resource that can be exploited from the shale with low to medium maturity, thus the integrated exploitation of shale and adjacent oil reservoirs has a great potential.

However, there is currently no efficient solution for the integrated exploitation of shale and adjacent oil reservoirs.

For the above technical problems, no effective solution has been proposed yet.

SUMMARY

An embodiment of the present disclosure provides a method for determining an integrated exploitation approach for a shale and adjacent oil reservoirs, to realize an efficient integrated exploitation of a shale and adjacent oil reservoirs and to improve a recovery ratio of adjacent oil reservoirs. The method comprises:

determining a thickness of an effective shale, thicknesses of adjacent effective oil reservoirs to the effective shale, and a planar distribution area of the effective shale and the adjacent effective oil reservoirs to the effective shale, based on logging data of a target reservoir of interest;

determining a top effective boundary of the adjacent effective oil reservoir above the effective shale, and a bottom effective boundary of the adjacent effective oil reservoir below the effective shale, based on the thickness of the effective shale, the thicknesses of the adjacent effective oil reservoirs to the effective shale, and the planar distribution area of the effective shale and the adjacent effective oil reservoirs to the effective shale;

determining a maximum seepage radius of each of the adjacent effective oil reservoirs to the effective shale, based on a formation pressure, a fracture pressure and a starting pressure gradient of the adjacent effective oil reservoir;

determining a well pattern for integrated exploitation of the effective shale and the adjacent effective oil reservoirs based on the thickness of the effective shale, the top effective boundary, the bottom effective boundary and the maximum seepage radius;

determining a well completion approach according to the well pattern for integrated exploitation; and determining a total number of perforation clusters of gas injection wells, a number of perforation clusters corresponding to each of the adjacent effective oil reservoirs, a gas injection amount per unit time of each of the perforation clusters, and a total gas injection amount per unit time of the gas injection wells, according to the well completion approach;

wherein the effective shale is in communication with all the adjacent effective oil reservoirs by boring-through of a fluctuating horizontal well or a vertical well.

Optionally, the method further comprises:

determining a shut-down time of the production wells for the effective shale, and a gas injection time, a gas injection amount and a start-up time and a shut-down time of the production wells for the adjacent effective oil reservoirs, based on oil and gas yields of the production wells for the effective shale.

Optionally, said determining the shut-down time of the production wells for the effective shale, and the gas injection time, the gas injection amount and the start-up time and the shut-down time of the production wells for the adjacent effective oil reservoirs according to oil and gas yields of the production wells for the effective shale comprises:

determining to shut down the production wells for the effective shale, and determining the shut-down time of the production wells for the effective shale, when a cumulative oil yield of the production wells for the effective shale reaches 90% of a final oil yield, or when a cumulative gas-oil ratio of the production wells for the effective shale is greater than 500, or when a monthly gas-oil ratio of the production wells for the effective shale is greater than 2000; and determining to start injecting gas into the adjacent effective oil reservoirs by using natural gas produced from the effective shale, and determining the gas injection time, the gas injection amount and the start-up time and the shut-down time of the production wells for the adjacent effective oil reservoirs, after the production wells for the effective shale are shut down.

Optionally, said determining to start injecting gas into the adjacent effective oil reservoirs by using natural gas generated by the effective shale, and determining the gas injection time, the gas injection amount and the start-up time and the shut-down time of the production wells for the adjacent effective oil reservoirs after the production wells for the effective shale are shut down comprises:

finishing a production of the production wells for the adjacent effective oil reservoirs, and determining the gas injection time, the gas injection amount and the start-up time and the shut-down time of the production wells for the adjacent effective oil reservoirs, when a gas amount generated in the effective shale satisfies a lower limit requirement of a minimum cumulative gas injection amount for oil displacement of the adjacent effective oil reservoirs, and after a value of daily oil and gas yields of a single well of the adjacent effective oil reservoirs becomes equal to a daily operation cost of the single well; and continuing exploitation of the adjacent effective oil reservoirs by injecting gas produced from the production wells for the effective shale, when a gas amount generated by in-situ conversion in the effective shale section does not satisfy the lower limit requirement of the minimum cumulative gas injection amount for oil displacement of the adjacent effective oil reservoirs, and determining to finish production of the production wells for the adjacent effective oil reservoirs, and determining the gas injection time, the gas injection amount and the start-up time and the shut-down time of the production wells for the adjacent effective oil reservoirs, after the value of daily oil and gas yields of the single well of the adjacent effective oil reservoirs becomes equal to the daily operation cost of the single well.

An embodiment of the present disclosure provides an apparatus for determining an integrated exploitation approach for a shale and adjacent oil reservoirs, to realize an efficient integrated exploitation of a shale and adjacent oil reservoirs and improve the recovery ratio of adjacent oil reservoirs. The apparatus comprises:

a parameter determination unit configured to determine a thickness of an effective shale, thicknesses of adjacent effective oil reservoirs to the effective shale, and a planar distribution area of the effective shale and the adjacent effective oil reservoirs to the effective shale, based on logging data of a target reservoir of interest; and determine a top effective boundary of the adjacent effective oil reservoirs above the effective shale, and a bottom effective boundary of the adjacent effective oil reservoirs below the effective shale, based on the thickness of the effective shale, the thicknesses of the adjacent effective oil reservoirs to the effective shale, and the planar distribution area of the effective shale and the adjacent effective oil reservoirs to the effective shale;

a maximum seepage radius determination unit configured to determine a maximum seepage radius of each of the adjacent effective oil reservoirs to the effective shale based on a formation pressure, a fracture pressure and a starting pressure gradient of the adjacent effective oil reservoirs to the effective shale;

a well pattern determination unit configured to determine a well pattern for integrated exploitation of the effective shale and the adjacent effective oil reservoirs based on the thickness of the effective shale, the top effective boundary, the bottom effective boundary and the maximum seepage radius;

a well completion approach determination unit configured to determine a well completion approach according to the well pattern for integrated exploitation; and determine a total number of perforation clusters of gas injection wells, a number of perforation clusters corresponding to each of the adjacent effective oil reservoirs, a gas injection amount per unit time of each perforation cluster, and a total gas injection amount per unit time of the gas injection wells, according to the well completion approach;

wherein the effective shale is in communication with all the adjacent effective oil reservoirs by boring-through of a fluctuating horizontal well or vertical well.

Optionally, the well pattern determination unit is further configured to:

adopt a fluctuating horizontal well pattern for the production wells and the gas injection wells for the adjacent effective oil reservoirs, when a first distance between the effective shale and the top effective boundary or a second distance between the effective shale and the bottom effective boundary is less than or equal to a vertical fluctuation distance of the fluctuating horizontal wells, or, a first distance top boundary effective oil reservoir accounts for 30% or lower or a second distance bottom boundary effective oil reservoir accounts for 30% or lower;

wherein a fluctuation period of a well trajectory of the fluctuating horizontal well is less than or equal to four times of the maximum seepage radius of a reservoir where the effective oil reservoir is located.

Optionally, the fluctuating horizontal well pattern for the adjacent effective oil reservoirs comprises a first well pattern and a second well pattern, wherein the first well pattern is a well pattern in which the gas injection wells are parallel to well trajectories of the production wells for the effective oil reservoir, the second well pattern is a well pattern in which the gas injection wells cross perpendicularly to well trajectories of the production wells for the adjacent effective oil reservoirs, and in the first well pattern and the second well pattern, the gas injection wells are parallel to planar projections of well trajectories of heating wells for the effective shale.

Optionally, the well pattern determination unit is further configured to:

adopt a vertical well pattern for the production wells and the gas injection wells for the adjacent effective oil reservoirs, when a first distance between the effective shale and the top effective boundary or a second distance between the effective shale and the bottom effective boundary is greater than a vertical fluctuation distance of the fluctuating horizontal wells, and a first distance top boundary effective oil reservoir accounts for 30% or higher or a second distance bottom boundary effective oil reservoir accounts for 30% or higher; and adopt a quasi-five-point vertical well pattern for the production wells for the effective shale and the production wells for the adjacent effective oil reservoirs, when the vertical well pattern is adopted for the production wells and the gas injection wells for the adjacent effective oil reservoirs, wherein the quasi-five-point vertical well pattern is a well patter in which four production wells for the effective shale form a first rectangle or square, and the production well for the adjacent effective oil reservoirs is located in a center of the first rectangle or square; or, four production wells for the adjacent effective oil reservoirs form a second rectangle or square, and the production well for the effective shale section is located in a center of the second rectangle or square.

Optionally, the well completion approach determination unit is further configured to:

adopt a screen pipe completion for both the gas injection wells and the production wells for the adjacent effective oil reservoirs, when an average permeability range among the adjacent effective oil reservoirs is less than or equal to 3, and there is no water layer between the effective shale section and the top effective boundary of the adjacent oil reservoirs and between the effective shale section and the bottom effective boundary of the adjacent oil reservoirs;

determine the well completion approach so that when a fluctuating horizontal well pattern is adopted for the gas injection wells and the production wells for the adjacent effective oil reservoirs, a well section of the gas injection wells that adopts the screen pipe completion is a whole well section of the gas injection wells entering into the effective shale; and a well section of the production wells for the adjacent effective oil reservoirs that adopts the screen pipe completion is a whole well section entering into the adjacent effective oil reservoir;

determine the well completion approach so that when a vertical well pattern is adopted for the production wells for the effective shale and the production wells for the adjacent effective oil reservoirs:

a screen pipe well section extends from the top effective boundary of the effective oil reservoir to the bottom boundary of the effective shale in the case that there is only an effective oil reservoir above the effective shale section;

the screen pipe well section extends from a top boundary of the effective shale to the bottom effective boundary of the effective oil reservoir in the case that there is only an effective oil reservoir below the effective shale; and the screen pipe well section extends from the top effective boundary of the effective oil reservoir above the effective shale to the bottom effective boundary of the effective oil reservoir below the effective shale in the case that there are effective oil reservoirs above and below the effective shale.

Optionally, the well completion approach determination unit is further configured to:

adopt a casing completion for both the gas injection wells and the production wells for the adjacent effective oil reservoirs, when an average permeability range among the adjacent effective oil reservoirs is greater than 3, or there are water layers between the effective shale section and the top effective boundary of the adjacent oil reservoirs and between the effective shale section and the bottom effective boundary of the adjacent oil reservoirs;

configure the well completion so that when a fluctuating horizontal well pattern is adopted for the gas injection wells and the production wells for the adjacent effective oil reservoirs, a well section of the gas injection wells that adopts the casing completion is a whole well section of the gas injection wells entering into the effective shale; and a well section of the production wells for the adjacent effective oil reservoirs that adopts the casing completion is a whole well section entering into the adjacent effective oil reservoir; and when a vertical well pattern is adopted for the production wells for the effective shale section and the production wells for the adjacent effective oil reservoirs:

a bottom boundary of a casing well section is a bottom boundary of the effective shale in the case that there is only an effective oil reservoir above the effective shale;

the bottom boundary of the casing well section is a bottom effective boundary of the effective oil reservoir in the case that there is only an effective oil reservoir below the effective shale; and the bottom boundary of the casing well section is the bottom effective boundary of the effective oil reservoir below the effective shale in the case that there are effective oil reservoirs above and below the effective shale.

Optionally, the well completion approach determination unit is further configured to:

determine, in the case that a casing completion is adopted, a reservoir space volume of the effective oil reservoir and a subsurface volume of accumulated injected gas in the effective oil reservoir within a control range of the gas injection section of the gas injection wells, according to a principle of determining a casing perforation density and a total number of perforations of the gas injection wells in the adjacent effective oil reservoirs above and below the effective shale;

determine the number of perforation clusters corresponding to each of the adjacent effective oil reservoirs in the casing completion, based on the reservoir space volume of the effective oil reservoir and the subsurface volume of the accumulated injected gas of the effective oil reservoir within the control range of the gas injection section of the gas injection wells; and determine the total number of perforation clusters and the total gas injection amount of the gas injection wells based on the number of perforation clusters corresponding to each of the adjacent effective oil reservoirs in the casing completion.

Optionally, the apparatus further comprises a production parameter determination unit configured to determine a shut-down time of the production wells for the effective shale, and a gas injection time, a gas injection amount and a start-up time and a shut-down time of the production wells for the adjacent effective oil reservoirs, based on oil and gas yields of the production wells for the effective shale.

Optionally, the production parameter determination unit is further configured to:

determine to shut down the production wells for the effective shale, and determine the shut-down time of the production wells for the effective shale, when a cumulative oil yield of the production wells for the effective shale reaches 90% of a final oil yield, or when a cumulative gas-oil ratio of the production wells for the effective shale is greater than 500, or when a monthly gas-oil ratio of the production wells for the effective shale is greater than 2000; and determine to start injecting gas into the adjacent effective oil reservoirs by using natural gas produced from the effective shale, and determine the gas injection time, the gas injection amount and the start-up time and the shut-down time of the production wells for the adjacent effective oil reservoirs, after the production wells for the effective shale are shut down.

An embodiment of the present disclosure further provides a computer device comprising a memory, a processor and a computer program stored in the memory and executable by the processor, wherein the processor implements, when executing the computer program, the method for determining an integrated exploitation approach for a shale and adjacent oil reservoirs as described above.

An embodiment of the present disclosure further provides a computer readable storage medium storing therein a computer program for performing the method for determining an integrated exploitation approach for a shale and adjacent oil reservoirs as described above.

Compared with the existing solutions of realizing exploitation of a shale and adjacent oil reservoirs by utilizing the horizontal well volume fracturing technique, in the technical solution provided in the embodiments of the present disclosure, the effective shale is in bore-through communication with all the adjacent effective oil reservoirs by using a fluctuating horizontal well or a vertical well, and the technical solution of the present disclosure is implemented by: determining a thickness of an effective shale, thicknesses of adjacent effective oil reservoirs to the effective shale, and a planar distribution area of the effective shale and the adjacent effective oil reservoirs to the effective shale, according to logging data of a target reservoir of interest; determining a top effective boundary of the adjacent effective oil reservoirs above the effective shale, and a bottom effective boundary of the adjacent effective oil reservoirs below the effective shale, according to the thickness of the effective shale, the thicknesses of each of the adjacent effective oil reservoirs to the effective shale, and the planar distribution area of the effective shale and the adjacent effective oil reservoirs to the effective shale; determining a maximum seepage radius of the adjacent effective oil reservoirs to the effective shale according to a formation pressure, a fracture pressure and a starting pressure gradient of the adjacent effective oil reservoirs to the effective shale; determining a well pattern for integrated exploitation of the effective shale and the adjacent effective oil reservoirs according to the thickness of the effective shale, the top effective boundary, the bottom effective boundary and the maximum seepage radius; determining a well completion approach according to the well pattern for integrated exploitation; and determining a total number of perforation clusters of gas injection wells, a number of perforation clusters corresponding to each of the adjacent effective oil reservoirs, a gas injection amount per unit time of each perforation cluster, and a total gas injection amount per unit time of the gas injection wells, according to the well completion approach, thereby achieving an efficient integrated exploitation of a shale and adjacent oil reservoirs, improving the recovery ratio of adjacent oil reservoirs, and providing a scientific guidance for the integrated exploitation of a shale and adjacent oil reservoirs.

BRIEF DESCRIPTION OF DRAWINGS

The drawings described herein are intended to provide a further understanding of the present disclosure and constitute a part of the present application and do not constitute any limitations to the present disclosure.

DESCRIPTION OF EMBODIMENTS

Figure 1:
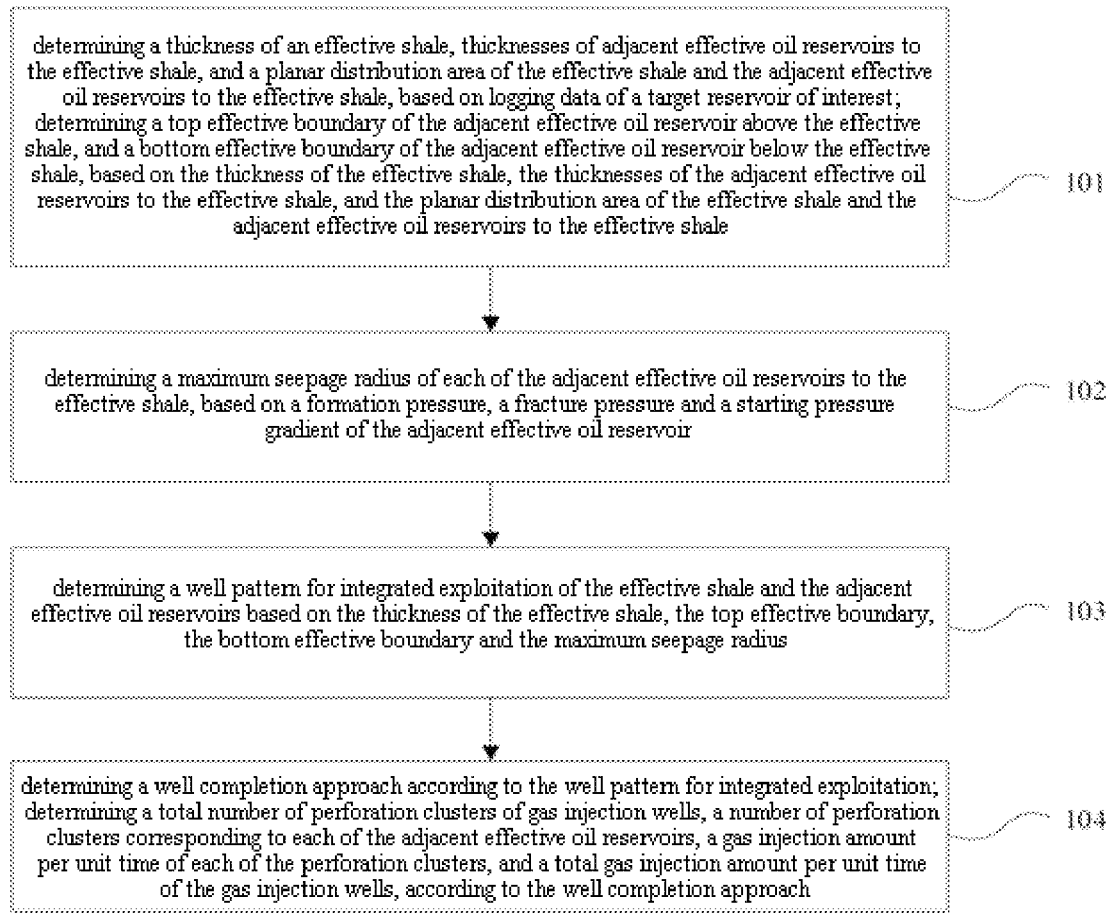
FIG. 1 is a flow schematic diagram of a method for determining an integrated exploitation approach for a shale and adjacent oil reservoirs according to an embodiment of the present disclosure.

In order to more clearly explain the purpose, technical solution and advantages of the disclosure, the disclosure will be further described hereinafter in detail in combination with the embodiments and the accompanying drawings. Here, the schematic embodiments of the disclosure and the description thereof are used for explaining the disclosure and do not constitute a limitation to the disclosure.

The inventor has found that, firstly, the existing in-situ conversion of shale and exploitation technology only aims at the shale reservoir, without utilizing the crude oil in adjacent oil reservoirs, thus it is impossible to realize an efficient production in the adjacent oil reservoirs. Secondly, the existing integrated exploitation technology of a shale reservoir and an oil reservoir next to the shale reservoir adopts two exploitation systems of the shale reservoir and the oil reservoir next to the shale reservoir. The current horizontal well volume fracturing technique is adopted in the oil reservoir next to the shale reservoir, and fractures communicating with the shale reservoir are generated due to the volume fracturing, resulting in that oil and gas produced when the shale reservoir is heated flow into oil reservoir exploitation wells along the fractures. At the same time, the horizontal well exploitation technique is adopted, and the oil reservoir drilled by the horizontal well is only one set of oil reservoir, so that it is impossible to pass through more than one set of oil reservoirs in a longitudinal direction and it is impossible to realize an effective exploitation of oil reservoirs adjacent to but not next to the shale reservoir, and a recovery ratio of the oil reservoir only has a small increase, thus the real integrated exploitation cannot be achieved and the exploitation effect is poor. In addition, because an interlayer exists between the oil reservoirs adjacent to the shale reservoir, a longitudinal communicating thickness of the fracturing is small, and the oil reservoir production in a large range in the longitudinal direction cannot be realized.

Thus, the prior arts which are relevant to the embodiments of the present disclosure mainly improve the recovery ratio for a portion of a shale reservoir and an oil reservoir in direct contact with or next to the shale reservoir, without addressing the technical problems of improving the exploitation and the recovery ratio in the case of multiple interlayers existing between the shale reservoir and the adjacent oil reservoirs. In view of the above technical problems, in order to overcome the shortcomings in the prior art that the integrated exploitation of the shale and adjacent oil reservoirs cannot be realized and the recovery ratio of adjacent oil reservoirs cannot be greatly improved, the inventor provides a solution of determining an integrated exploitation approach of the shale and adjacent oil reservoirs, in which fluctuating horizontal production wells (fluctuating horizontal production wells refer to horizontal wells with certain fluctuation periods, which are different from the conventional horizontal wells that have no fluctuation in horizontal trajectories along the same direction) or vertical wells are adopted, to bore through the oil reservoir adjacent to the shale and connect the shale reservoir with the adjacent oil reservoirs, thereby solving this problem without fracturing, realizing a high-efficiency production of the adjacent oil reservoirs in the longitudinal direction, effectively developing the shale and the adjacent oil reservoirs, and greatly improving the recovery ratio of the adjacent oil reservoirs.

The integrated exploitation technology of a shale and adjacent oil reservoirs is different from the prior art in many aspects such as the well pattern, the well-net mode and the control of exploitation time of the shale and the adjacent oil reservoirs, which are not involved in the prior art. The integrated exploitation of a shale and adjacent oil reservoirs refers to the following actions of: utilizing a high-temperature and high-pressure natural gas generated in the later stage of in-situ conversion exploitation of the shale or an injection supplementary gas source as driving energy and medium, exploiting the shale reservoir first, and then exploiting the adjacent oil reservoirs, so as to realize the integrated exploitation, improve the recovery ratio of the adjacent oil reservoirs, and achieve a high-efficiency utilization of resources of the shale and the adjacent oil reservoirs.

The solution of determining an integrated exploitation approach for a shale and adjacent oil reservoirs is introduced in detail below.

FIG. 1 is a flow schematic diagram of a method for determining an integrated exploitation approach for a shale and adjacent oil reservoirs according to an embodiment of the present disclosure. As shown in FIG. 1, the method comprises the following steps:

a step 101: determining a thickness of an effective shale, thicknesses of adjacent effective oil reservoirs to the effective shale, and a planar distribution area of the effective shale and the adjacent effective oil reservoirs to the effective shale, based on logging data of a target reservoir of interest; determining a top effective boundary of adjacent effective oil reservoirs above the effective shale (hereinafter referred to as a top effective boundary), and a bottom effective boundary of adjacent effective oil reservoirs below the effective shale (hereinafter referred to as a bottom effective boundary), based on the thickness of the effective shale, the thickness of the adjacent effective oil reservoirs to the effective shale, and the planar distribution area of the effective shale and the adjacent effective oil reservoirs to the effective shale;

a step 102: determining a maximum seepage radius of each of the adjacent effective oil reservoirs to the effective shale based on a formation pressure, a fracture pressure and a starting pressure gradient of the adjacent effective oil reservoirs to the effective shale;

a step 103: determining a well pattern for integrated exploitation of the effective shale and the adjacent effective oil reservoirs based on the thickness of the effective shale, the top effective boundary, the bottom effective boundary and the maximum seepage radius;

a step 104: determining a well completion approach according to the well pattern for integrated exploitation; and determining a total number of perforation clusters of gas injection wells, a number of perforation clusters corresponding to each of the adjacent effective oil reservoirs, a gas injection amount per unit time of each perforation cluster, and a total gas injection amount per unit time of the gas injection wells, according to the well completion approach;

wherein the effective shale is in communication with all the adjacent effective oil reservoirs by boring-through of a fluctuating horizontal well or a vertical well.

The steps involved in the embodiment of the present disclosure will be described in detail with reference to FIG. 2 to FIG. 15.

I. Firstly, the above step 101 is described.

Figure 2:
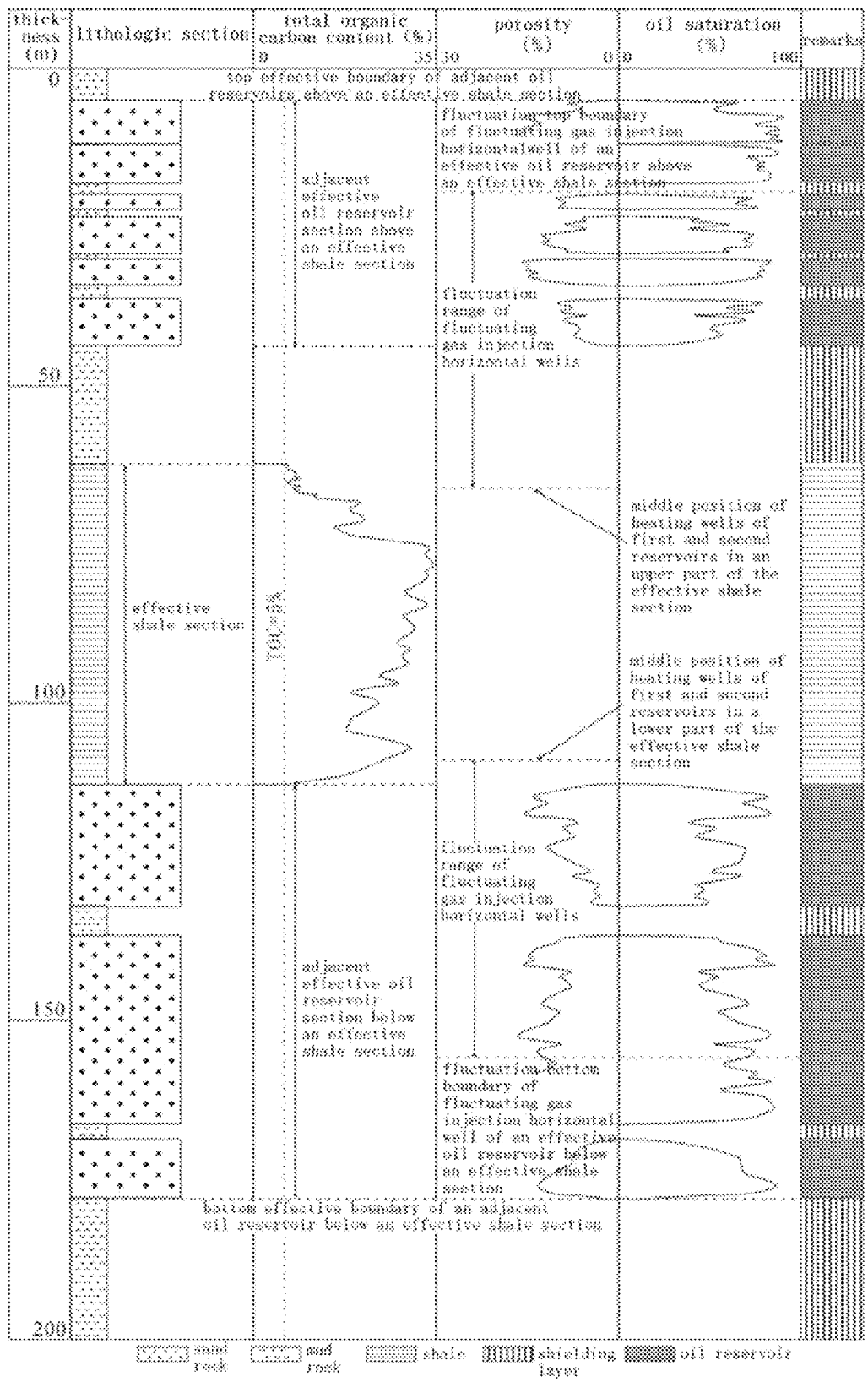
FIG. 2 is a diagram of a longitudinal distribution relation among an effective shale section, adjacent effective oil reservoirs, and an interlayer according to an embodiment of the present disclosure.
Figure 3:
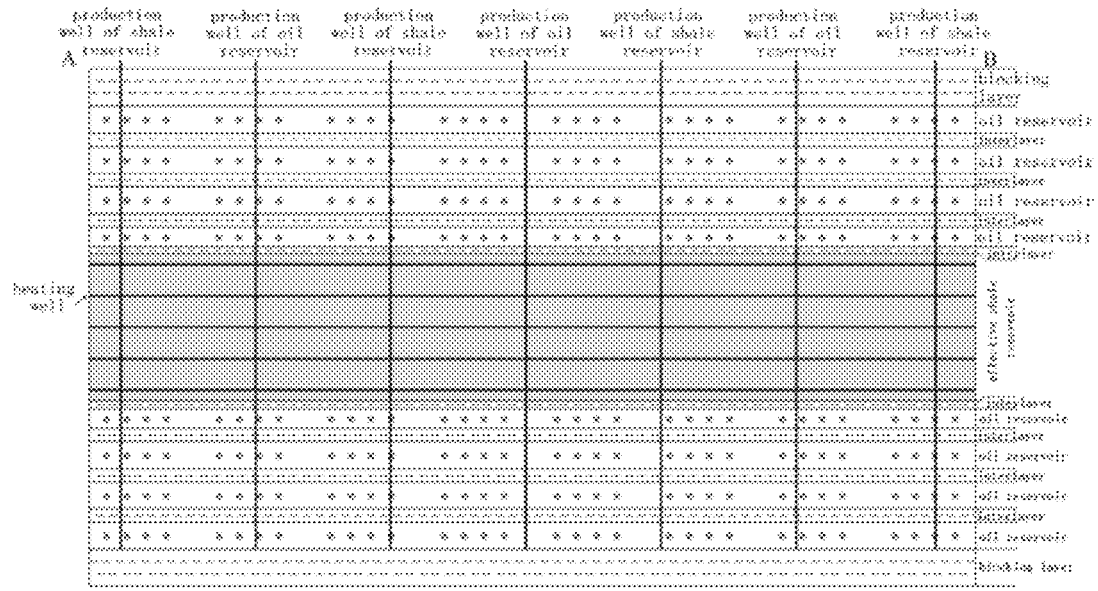
FIG. 3 is a cross-sectional view of parallel heating wells in a vertical production well pattern of the effective shale section and the adjacent effective oil reservoirs according to an embodiment of the present disclosure.
Figure 4:
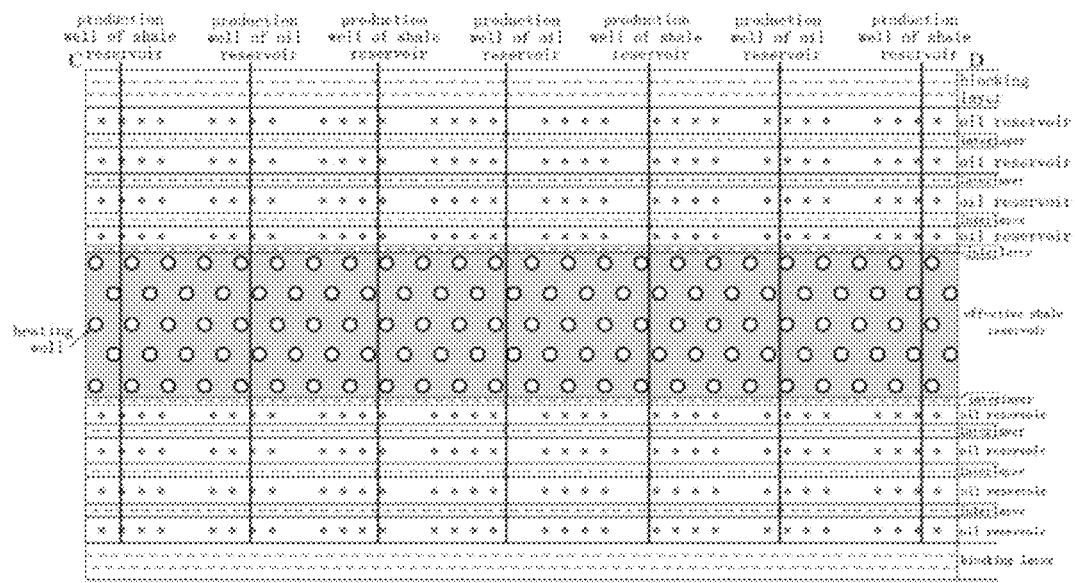
FIG. 4 is a cross-sectional view of vertical heating wells in a vertical production well pattern of the effective shale section and the adjacent effective oil reservoirs according to an embodiment of the present disclosure.
Figure 5:
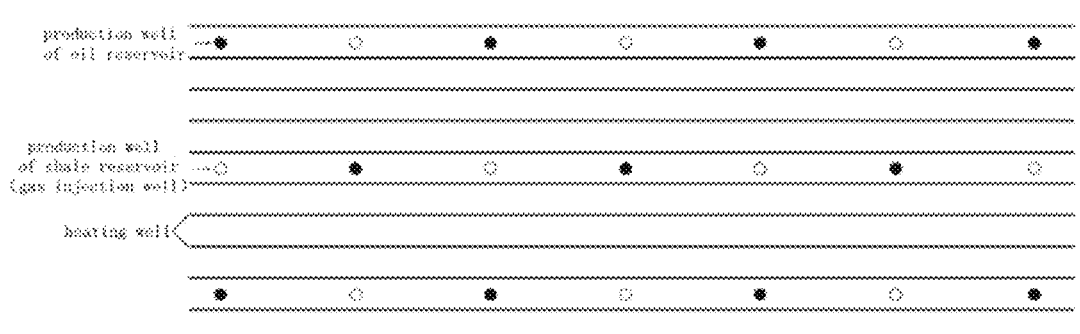
FIG. 5 is a cross-sectional view of a cross-section vertical projection in a vertical production well pattern of the effective shale section and the adjacent effective oil reservoirs according to an embodiment of the present disclosure.
Figure 6:
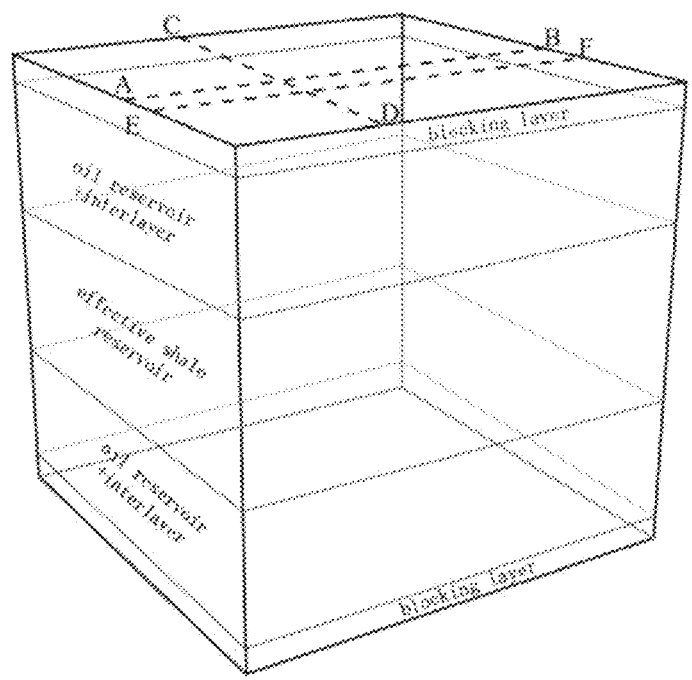
FIG. 6 is a schematic diagram of positions in a fluctuating horizontal well pattern according to an embodiment of the present disclosure.
Figure 7:
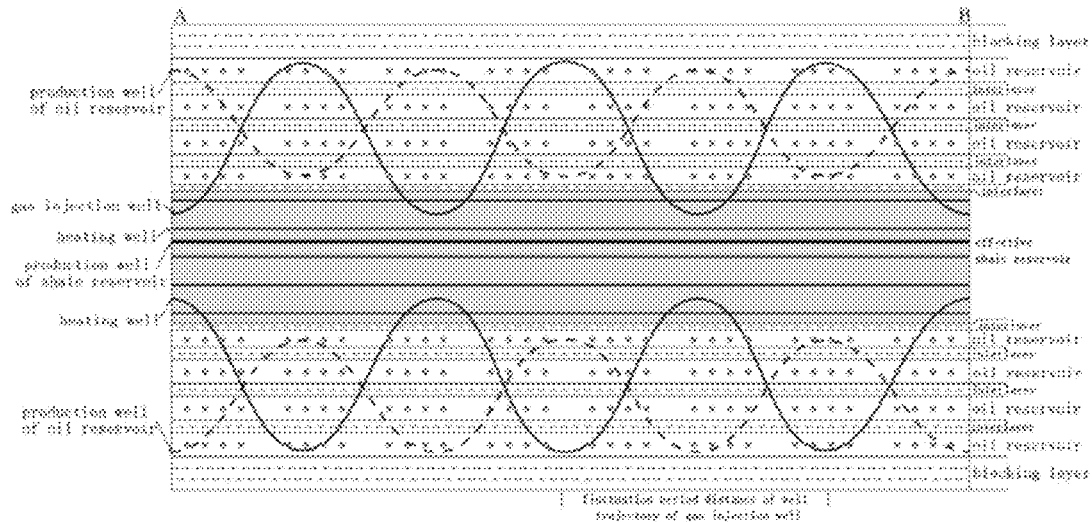
FIG. 7 is a cross-sectional view of parallel heating wells in a parallel well pattern of fluctuating horizontal production wells and fluctuating horizontal gas injection wells in the adjacent effective oil reservoirs according to an embodiment of the present disclosure.
Figure 8:
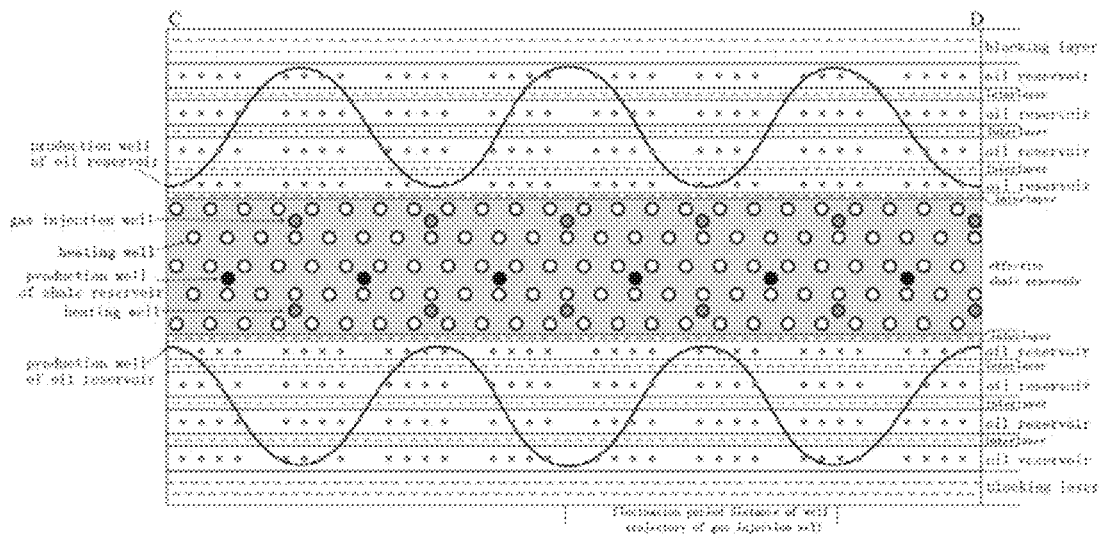
FIG. 8 is a cross-sectional view of vertical heating wells in a parallel well pattern of fluctuating horizontal production wells and fluctuating horizontal gas injection wells in the adjacent effective oil reservoirs according to an embodiment of the present disclosure.
Figure 9:
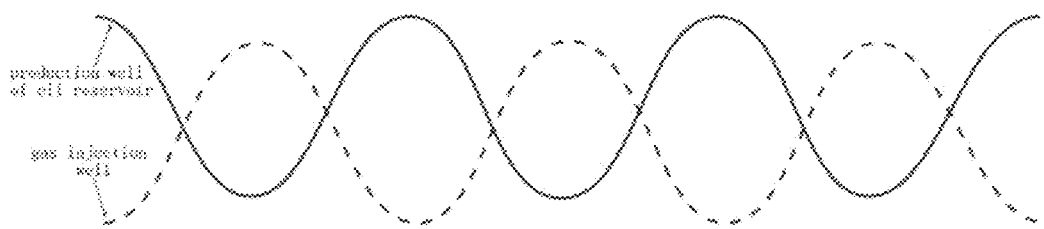
FIG. 9 is a cross-sectional view of adjacent production wells and gas injection wells in a parallel well pattern of fluctuating horizontal production wells and fluctuating horizontal gas injection wells in the adjacent effective oil reservoirs according to an embodiment of the present disclosure.
Figure 10:
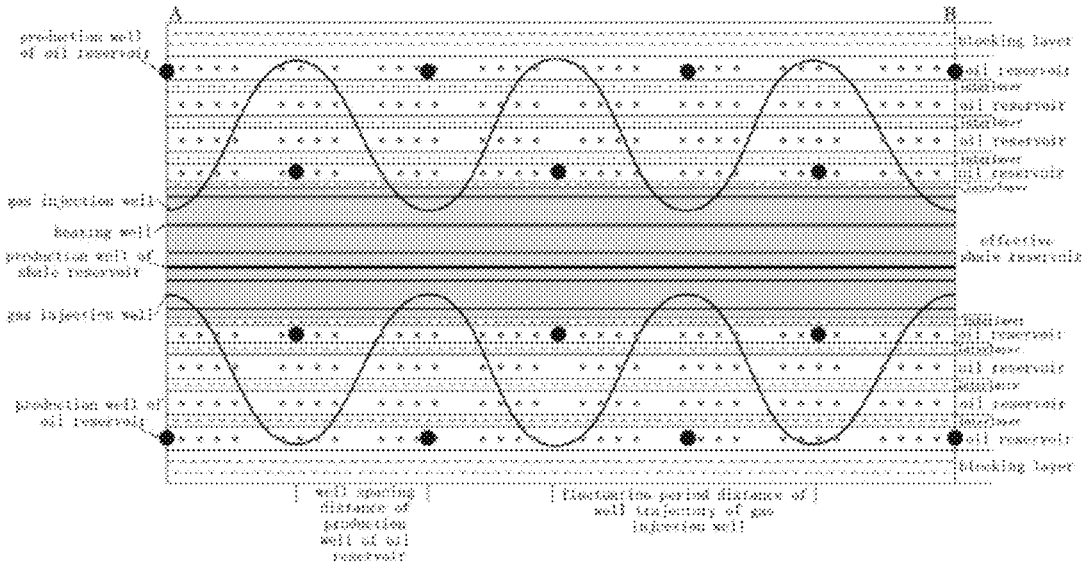
FIG. 10 is a cross-sectional view of parallel heating wells in a cross vertical well pattern of fluctuating horizontal production wells and fluctuating horizontal gas injection wells in the adjacent effective oil reservoirs according to an embodiment of the present disclosure.
Figure 11:
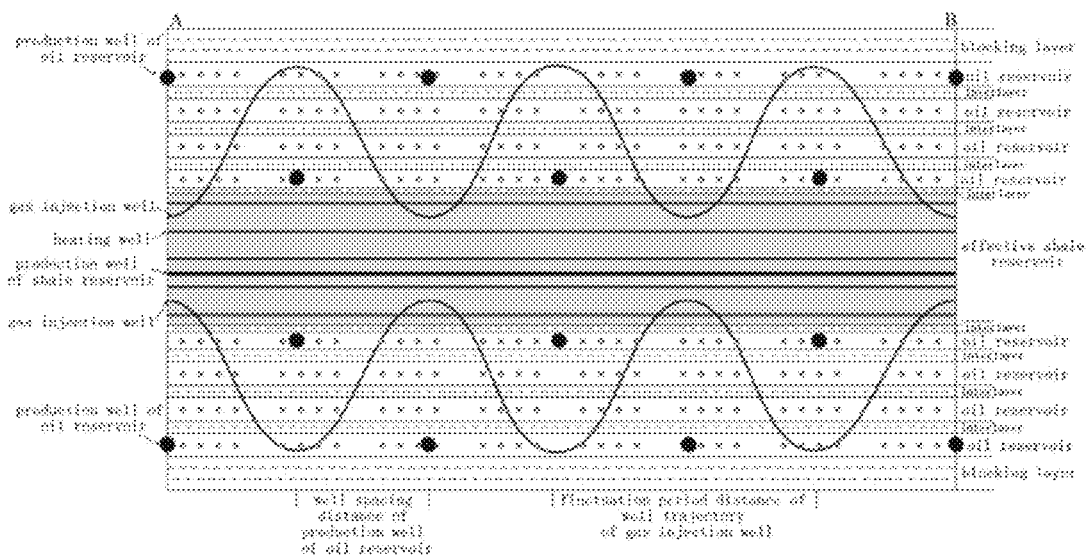
FIG. 11 is a cross-sectional view of vertical heating wells in a cross vertical well pattern of fluctuating horizontal production wells and fluctuating horizontal gas injection wells in the adjacent effective oil reservoirs according to an embodiment of the present disclosure.
Figure 12:
FIG. 12 is a cross-sectional view of adjacent two gas injection wells and production wells in adjacent effective oil reservoirs in a cross vertical well pattern of fluctuating horizontal production wells and fluctuating horizontal gas injection wells in the adjacent effective oil reservoirs according to an embodiment of the present disclosure.
Figure 13:
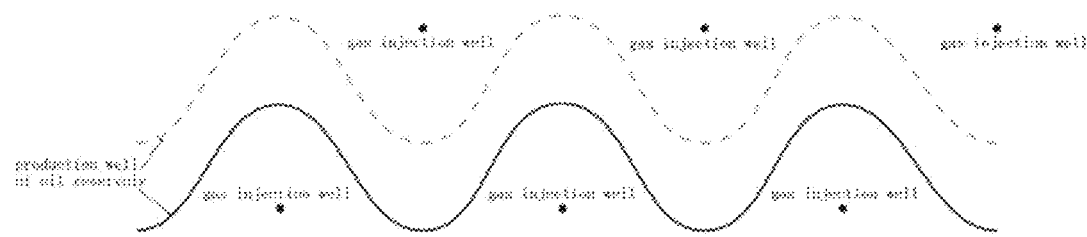
FIG. 13 is a cross-sectional view of adjacent two production wells and gas injection wells in the adjacent effective oil reservoirs in a cross vertical well pattern of fluctuating horizontal production wells and fluctuating horizontal gas injection wells in the adjacent effective oil reservoirs according to an embodiment of the present disclosure.
Figure 14:
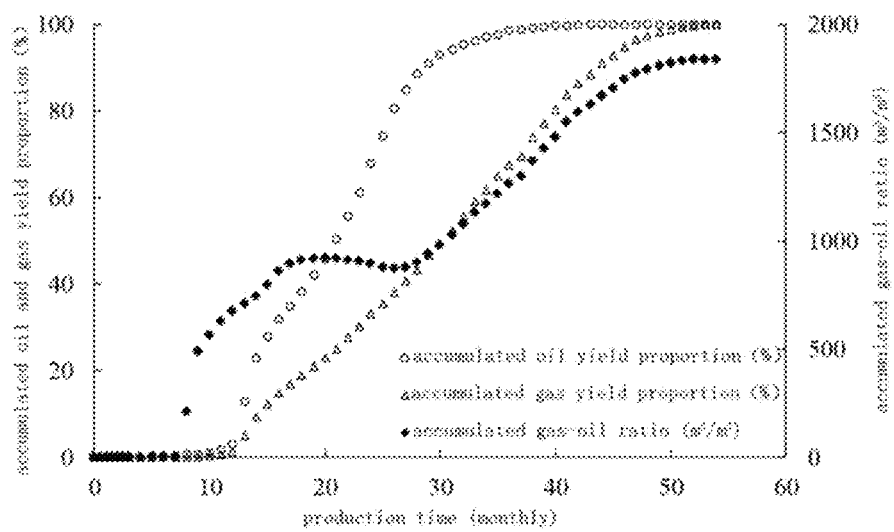
FIG. 14 is a graph showing a cumulative oil yield proportion, a cumulative gas yield proportion and a cumulative gas-oil ratio of a production well in an effective shale section according to an embodiment of the present disclosure.
Figure 15:
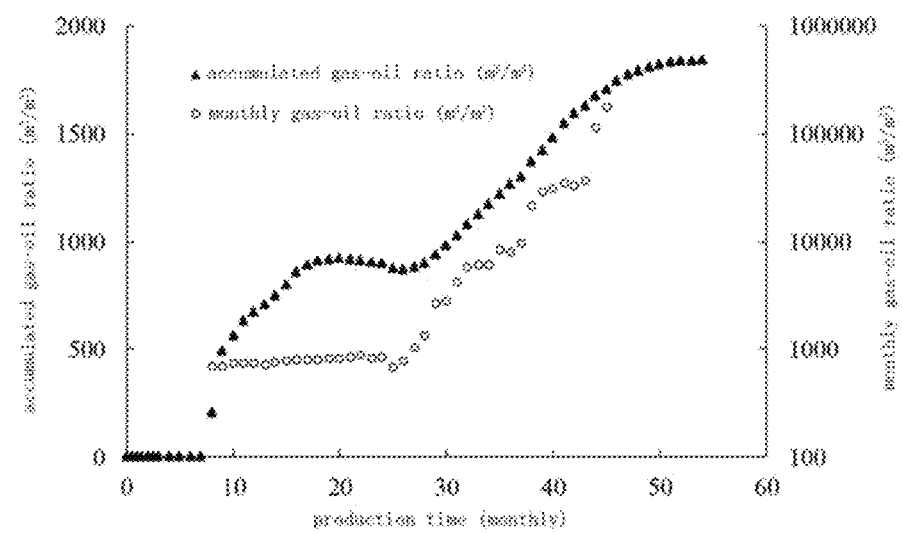
FIG. 15 is a graph showing a cumulative gas-oil ratio and a monthly gas-oil ratio of a production well in an effective shale section according to an embodiment of the present disclosure.

The step 101 comprises: collecting logging data of a target reservoir of interest; acquiring a thickness of an effective shale section, thicknesses of adjacent effective oil reservoirs to the effective shale section, and a planar distribution area of the effective shale section and the adjacent effective oil reservoir section (in the planar distribution area, plane changes of a top oil reservoir and a bottom oil reservoir are taken into account to determine a top effective boundary and a bottom effective boundary of oil reservoirs in different areas); acquiring an average total organic carbon content (TOC) of the effective shale section, an average hydrogen index (HI) and an average shale density ($\rho$), a thickness ($H_{shale}$) of the effective shale section, a top effective boundary (a top boundary of the topmost effective oil reservoir above the effective shale, as shown in FIG. 2) and the bottom effective boundary (a bottom boundary of the bottommost effective oil reservoir below the effective shale, as shown in FIG. 2) of adjacent effective oil reservoirs above and below the effective shale section, and a cumulative thickness of the effective oil reservoirs.

In an embodiment, the effective shale satisfies a first preset condition that a kerogen type of the shale is one or a combination of a type I and a type II, a total organic carbon content (TOC) is greater than 4%-6%, and a vitrinite reflectance (Ro) is less than 0.95%.

The effective shale satisfies a second preset condition that: a thickness of continuous shale with kerogen type, TOC and Ro satisfying the first preset condition is greater than 8 m; or a thickness of a single reservoir of shale with kerogen type, TOC and Ro satisfying the first preset condition is greater than 3 m, a thickness of a section, not satisfying the first preset condition between the effective shales is less than 1 m, and a cumulative thickness of the effective shales satisfying the first preset condition is greater than 10 m; or a cumulative thickness of the effective shales with kerogen type, TOC and Ro satisfying the first preset condition is greater than 8 m, and a ratio of the cumulative thickness of the effective shales satisfying the first preset condition to a thickness of a formation where the effective shales are located is more than 80%.

The adjacent effective oil reservoirs satisfy a third preset condition that: an effective porosity of the adjacent effective oil reservoirs is greater than a porosity lower limit, a permeability of the adjacent effective oil reservoirs is greater than a permeability lower limit, and an oil saturation of the adjacent effective oil reservoirs is greater than an oil saturation lower limit.

In a specific implementation, the target reservoir in the research area includes an effective shale section, adjacent effective oil reservoir section, and an interlayer section between the effective shale section and the adjacent effective oil reservoir section. The effective shale section refers to a shale section satisfying the conditions of in-situ conversion and exploitation. The effective oil reservoir section refers to an oil reservoir section of adjacent oil reservoirs above and below the effective shale section, which satisfies the lower limit values of $\phi$, K and So and can be effectively exploited. The interlayer section refers to a non-effective oil reservoir section and a non-effective shale section between the effective oil reservoir section and the effective shale section in the target reservoir.

In a specific implementation, the effective shale section of the target reservoir in the research area needs to satisfy the following conditions: the kerogen type of shale is a type I or a type II or a combination of the type I with the type II, and the total organic carbon content (TOC) is great than 4%-6%, and preferably the TOC is greater than 5%; the vitrinite reflectance (Ro) is less than 0.95%, and preferably Ro is less than 0.9%. The thickness of continuous shale with kerogen type, TOC and Ro satisfying the above condition is greater than 8 m, preferably 15 m; or, the thickness of the single reservoir of shale with kerogen type, TOC and Ro satisfying the above condition is greater than 3 m, and the thickness of a section not satisfying the first preset condition between the effective shales is less than 1 m, and the cumulative thickness of the effective shales satisfying the above condition is greater than 10 m, and preferably 15 m; or, the cumulative thickness of the effective shale sections with kerogen type, TOC and Ro satisfying the above condition is greater than 8 m, preferably 15 m, and the cumulative thickness of the effective shale sections which satisfy the above condition occupies more than 80% of the formation where the effective shales are located.

In a specific implementation, core analysis and test data of the target reservoir in the research area is collected, the kerogen type and the Ro of the effective shale section of the target reservoir in the research area are acquired, and the planar distribution range of the kerogen type and the Ro of the target reservoir in the research area is acquired. The logging data of the target reservoir in the research area is collected, and the logging data at least includes natural gamma logging, density logging, neutron logging, acoustic logging, resistivity logging, caliper logging and other data. The total organic carbon content (TOC) of logging points in the effective shale section is acquired through the logging interpretation by using the logging data of the target reservoir in the research area. The TOC mean value and thickness of the shale section, the logging points of which satisfy the effective shale condition, are obtained by using the TOC of logging points and the spacing between the logging points in the logging interpretation. A distribution range satisfying the effective shale condition is acquired.

In a specific implementation, the logging data of the target reservoir in the research area is collected, and the logging data at least includes natural gamma logging, density logging, neutron logging, acoustic logging, resistivity logging, caliper logging and other data. The effective porosity ($\Phi$), permeability (K) and oil saturation (So) of the logging points of the effective reservoir section are acquired through logging interpretation by using the logging data of the target reservoir in the research area. The oil test data of the effective oil reservoir in the research area is collected, and the lower limit values of $\Phi$, K, So of the effective oil reservoir are acquired. The oil reservoir whose $\Phi$, K, So are all greater than their respective lower limit values is regarded as an effective oil reservoir. $\Phi$, K, So of the logging points of the effective reservoir section are acquired by using the logging interpretation, to obtain the average values of $\Phi$, K, So and the thickness of the effective reservoir section. A top boundary depth and a bottom boundary depth of the adjacent effective oil reservoirs above and below the effective shale section are acquired.

In a specific implementation, according to the logging interpretation data, the thickness and the longitudinal distribution depth of the interlayer section in the target section can further be acquired to determine a non-effective oil reservoir section and a non-effective shale section between the effective oil reservoir section and the effective shale section. In comparison with the prior art, in the embodiments of the disclosure, the influence of the interlayer section is considered to implement an integrated exploitation of the shale and the adjacent oil reservoirs, thereby improving the accuracy of determining the integrated exploitation approach of the shale and the adjacent oil reservoirs.

In a specific implementation, according to the logging interpretation data, the top effective boundary and the bottom effective boundary of the adjacent effective oil reservoirs above and below the effective shale section, and a cumulative thickness of the oil reservoirs of the target reservoir in the research area are acquired (FIG. 2).

II. Secondly, the above step 102 is described.

The parameters of the formation pressure, the fracture pressure and the starting pressure gradient of the effective oil reservoir of the target reservoir in the research area are acquired to determine the maximum seepage radius of the effective oil reservoir.

In a specific implementation, a reservoir where the effective oil reservoir adjacent to the effective shale section is located is generally a low-permeability or dense reservoir, and when the fluid seeps in the low-permeability or dense reservoir, it must have an additional pressure gradient to overcome the resistance caused by an adsorption film or a hydration film on surface of the rock, and the additional pressure gradient is called as a starting pressure gradient. Under a condition of being driven by the same pressure difference, the greater the starting pressure gradient of the oil reservoir is, the less the seepage radius of the fluid is.

In a specific implementation, the rock in the formation has a certain tension resistance. When a pressure applied to the rock in the formation exceeds a certain value, the rock may fracture, and the pressure is called as a fracture pressure. Under the reservoir conditions, the fracture pressure of the reservoir is less than the fracture pressure of the shale. During the process of oil and gas exploitation, the injection fluid pressure should be kept less than the fracture pressure of the oil reservoir; otherwise, the reservoir where the oil reservoir is located may generate cracks, thereby forming a fast flow path of the fluid, so that a sweep coefficient of the injection fluid in the oil reservoir is reduced, then the recovery ratio may be reduced.

In a specific implementation, the core and fracturing data of the effective reservoir section of the target reservoir in the research area are collected to acquire a fracture pressure of the effective oil reservoir. The core samples of the effective reservoir section are collected to acquire the starting pressure gradient of the effective oil reservoir. In the integrated exploitation of the effective shale section and the adjacent effective oil reservoirs, a difference between a fracture pressure of the effective oil reservoir and a formation pressure of the effective oil reservoir is the maximum pressure difference that drives the fluid to flow in the effective oil reservoir, that is, the maximum seepage radius of the corresponding effective oil reservoir. The maximum seepage radius of the effective oil reservoir is determined by the equation (1).

$$R=(P_b-P_f)/G \qquad (1)$$

wherein R denotes the maximum seepage radius, $P_b$ denotes the fracture pressure of the reservoir where the oil reservoir is located, MPa; $P_f$ denotes the formation pressure of the reservoir where the oil reservoir is located, MPa; and G denotes the starting pressure gradient of the reservoir where the oil reservoir is located, MPa/m.

III. Next, the above step 103 is described.

A step 103: determining a well pattern and approach for integrated exploitation of the effective shale section and the adjacent effective oil reservoirs based on the related parameters obtained from the above steps 101 and 102.

The integrated exploitation of the effective shale section and the adjacent effective oil reservoirs refers to that: the effective shale section is exploited firstly, then the production wells in the effective shale section are shut down, and the adjacent effective oil reservoirs are exploited by using the gas injection well.

In an embodiment, the step of determining a well pattern for integrated exploitation of the effective shale and the adjacent effective oil reservoirs according to the thickness of the effective shale, the top effective boundary, the bottom effective boundary and the maximum seepage radius may include:

determining a well distance between the gas injection wells and production wells in an effective oil reservoir based on the maximum seepage radius of a reservoir where the effective oil reservoir is located, wherein the well distance between the gas injection wells and the production wells in the effective oil reservoir is less than or equal to the maximum seepage radius.

In a specific implementation, the well distance between the gas injection wells and the production wells in the effective oil reservoir is acquired according to the maximum seepage radius of the reservoir where the effective oil reservoir is located, and preferably, the well distance is equal to the maximum seepage radius. The recovery ratio of the effective oil reservoir can be improved by determining the well distance between the gas injection wells and the production wells according to the maximum seepage radius.

Due to different sedimentary environments of the target reservoirs in different research areas, the effective shale section and the adjacent effective reservoir are greatly different in terms of spatial distribution, thereby a distance between the effective shale section and the top boundary of the adjacent effective oil reservoirs above the effective shale section and a distance between the effective shale section and the bottom boundary of the adjacent effective oil reservoirs below the effective shale section are different. Because it is determined by the existing drilling conditions that a fluctuation range of well trajectories of the fluctuating horizontal wells is limited somewhat in implementation, a fluctuating horizontal well pattern or a vertical well pattern is adopted according to different conditions. The two well patterns are introduced hereinafter.

Before introduction, definitions of the top boundary of effective oil reservoir and the bottom boundary of effective oil reservoir, as well as the fluctuation top boundary of fluctuating gas injection horizontal well and the fluctuation bottom boundary of fluctuating gas injection horizontal well are introduced.

A top boundary of an effective oil reservoir above an effective shale section is a top boundary of the effective oil reservoir where Φ, K, So of the topmost oil reservoir of the effective shale section are greater than their lower limits, and a bottom boundary of the effective oil reservoir above the effective shale section is a bottom boundary of the effective oil reservoir where Φ, K, So of the topmost oil reservoir of the effective shale section are greater than their lower limits. A bottom boundary of an effective oil reservoir below an effective shale section is a bottom boundary of the effective oil reservoir where Φ, K, So of the bottommost oil reservoir of the effective shale section are greater than their lower limits, and a bottom boundary of the effective oil reservoir below the effective shale section is a bottom boundary of the effective oil reservoir where Φ, K, So of the bottommost oil reservoir of the effective shale section are greater than their lower limits (see FIG. 2).

A fluctuation top boundary of a fluctuating gas injection horizontal well of an effective oil reservoir above the effective shale section is a top fluctuation boundary of the fluctuating gas injection horizontal well, and the bottom boundary is located in the middle of the heating wells of first reservoir and the heating wells of second reservoir in the upper part of the effective shale section, and gas injection well planar projection is located in the middle of the heating wells of the first reservoir in the upper part of the effective shale section. A fluctuation bottom boundary of a fluctuating gas injection horizontal well of an effective oil reservoir below the effective shale section is a bottom fluctuation boundary of the fluctuating gas injection horizontal well, and the top boundary is located in the middle of the heating wells of first reservoir and the heating wells of second reservoir in the lower part of the effective shale section, and gas injection well planar projection is located in the middle of the heating wells of the first reservoir in the lower part of the effective shale section (see FIGS. 2, 7, 8, 10 and 11).

The top effective boundary mentioned in the step 101 is the top boundary of the effective oil reservoir above the effective shale section and the top fluctuation boundary of the fluctuating gas injection horizontal well of the effective oil reservoir above the effective shale section. The bottom effective boundary mentioned in the step 101 is the bottom boundary of the effective oil reservoir below the effective shale section and the bottom fluctuation boundary of the fluctuating gas injection horizontal well of the effective oil reservoir below the effective shale section.

1. The first type: a vertical well pattern.

In an embodiment, the step of determining a well pattern for integrated exploitation of the effective shale and the adjacent effective oil reservoirs based on the thickness of the effective shale, the top effective boundary, the bottom effective boundary and the maximum seepage radius may include:

when a first distance between the effective shale (the above described middle position of the heating wells of the first reservoir and the heating wells of the second reservoir in the upper part of the effective shale section) and the top effective boundary (the above described top effective boundary of the effective oil reservoir), or a second distance between the effective shale (the above described middle position of the heating wells of the first reservoir and the heating wells of the second reservoir in the lower part of the effective shale section) and the bottom effective boundary (the above described bottom effective boundary of the effective oil reservoir), is greater than a vertical fluctuation distance of the fluctuating horizontal wells, and a first distance top boundary effective oil reservoir (the top boundary of the upper oil reservoir) accounts for 30% or higher, or a second distance bottom boundary effective oil reservoir (the bottom boundary of the lower oil reservoir) accounts for 30% or higher and preferably 50%, a vertical well pattern is adopted the production wells and the gas injection wells of the adjacent effective oil reservoirs adopt.

When the vertical well pattern is adopted in the production wells and the gas injection wells of the adjacent effective oil reservoirs, a Quasi-five-point vertical well pattern is adopted in the production wells for the effective shale and the production wells for the adjacent effective oil reservoirs; the Quasi-five-point vertical well pattern is that four production wells for the effective shale form a first rectangle or square, and the production well of the adjacent effective oil reservoirs is located in a center of the first rectangle or square; or, four production wells for the adjacent effective oil reservoirs form a second rectangle or square, and the production well of the effective shale section is located in a center of the second rectangle or square.

In a specific implementation, when a distance (the first distance) between the effective shale section and the top boundary of the adjacent effective oil reservoirs above the effective shale section, or a distance (the second distance) between the effective shale section and the bottom boundary of the adjacent effective oil reservoirs below the effective shale section is greater than a vertical fluctuation distance of the fluctuating horizontal wells, and a first distance top boundary effective oil reservoir accounts for 30% or higher or a second distance bottom boundary effective oil reservoir accounts for 30% or higher and preferably 50%, a vertical well pattern is adopted. That is, when the first distance or the second distance exceeds the technical requirements of the existing fluctuating horizontal well drilling implementation, drilling and exploitation of all adjacent oil reservoirs of the effective shale section cannot be realized, and when the utilization rate of the effective oil reservoir is less than 30% and preferably less than 50%, and under such a condition, in order to improve the utilization level and the recovery ratio of the crude oil in the adjacent effective oil reservoirs to the effective shale section as much as possible, the vertical well pattern is adopted in both the production wells and the gas injection wells in the effective reservoir section.

In a specific implementation, when the vertical well pattern is adopted, the vertical well pattern is adopted in all the production wells and the gas injection wells of the effective shale section and the adjacent effective oil reservoirs. A "Quasi-five-point" vertical well pattern is adopted in the production wells for the effective shale section and the production wells for the adjacent effective oil reservoirs. The "Quasi-five-point" vertical well pattern is that four production wells for the effective shale form a rectangle or a square, and the production well of the adjacent effective oil reservoirs is located in a center of the rectangle or the square, or, four production wells for the adjacent effective oil reservoirs form a rectangle or a square, and the production well of the effective shale section is located in the center of the rectangle or the square (see FIGS. 3, 4 and 5).

In a specific implementation, the "Quasi-five-point" vertical well pattern has advantages that: it can be ensured that the oil in the reservoirs above and below the effective shale section can be exploited in a relatively short period of time, and because heating wells for the effective shale section are needed to provide a gas drive, if the heating time of the heating wells is extended, the required energy will be increased and the benefit will be reduced.

2. The second type: a fluctuating horizontal well pattern.

In an embodiment, the step of determining a well pattern for integrated exploitation of the effective shale and the adjacent effective oil reservoirs based on the thickness of the effective shale, the top effective boundary, the bottom effective boundary and the maximum seepage radius may include:

when a first distance between the effective shale and the top effective boundary, or a second distance between the effective shale and the bottom effective boundary is less than or equal to a vertical fluctuation distance of the fluctuating horizontal wells, or the first distance top boundary effective oil reservoir accounts for 30% or lower or the second distance bottom boundary effective oil reservoir accounts for 30% or lower and preferably 50%, a fluctuating horizontal well pattern is adopted in the production wells and the gas injection wells of the adjacent effective oil reservoirs. A fluctuation period distance of a well trajectory of the fluctuating horizontal wells is less than or equal to four times of the maximum seepage radius of a reservoir where the effective oil reservoir is located.

In a specific implementation, when a distance (the first distance) between the effective shale (the above described middle position of the heating wells of the first and second reservoirs in the upper part of the effective shale section) and the top effective boundary (the above described top effective boundary of the effective oil reservoir), or a distance (the second distance) between the effective shale (the above described middle position of the heating wells of first and second reservoirs in the lower part of the effective shale section) and the bottom effective boundary (the above described bottom effective boundary of the effective oil reservoir) satisfies the implementation conditions of trajectory drilling of the fluctuating horizontal wells, i.e., when the first distance between the effective shale and the top effective boundary, or the second distance between the effective shale and the bottom effective boundary, is less than or equal to a vertical fluctuation distance of the fluctuating horizontal wells, or the first distance top boundary effective oil reservoir accounts for 30% or lower or the second distance bottom boundary effective oil reservoir accounts for 30% or lower and preferably 50%, a fluctuating horizontal well pattern is adopted in the adjacent effective oil reservoirs.

In a specific implementation, when the fluctuating horizontal well pattern is adopted, the fluctuation period distance of the well trajectory of the fluctuating horizontal wells is less than or equal to four times of the maximum seepage radius of the reservoir where the effective oil reservoir is located, so that it is possible to make all the oil in the adjacent oil reservoir within a range controlled by the fluctuating horizontal well be fully utilized, thereby improving the utilization rate of resources and the recovery rate.

In an embodiment, N+1.5 times of a distance between the horizontal production wells for the effective shale section is used as a basis for designing a well spacing trajectory of the gas injection wells for the effective oil reservoir, which are fluctuating horizontal wells, wherein N is an integer, preferably 2.

In a specific implementation, preferably 2+1.5 times of a distance between the horizontal production wells for the effective shale section is used as a condition for designing a well spacing trajectory of the gas injection wells (fluctuating horizontal wells) of the effective oil reservoir, which is favorable for drilling and improving the recovery ratio of the effective oil reservoir, such that the horizontal production well is located in a center position of the heating wells to facilitate drilling.

In an embodiment, the fluctuating horizontal well pattern of the adjacent effective oil reservoirs includes a first well pattern and a second well pattern; wherein the first well pattern is a well pattern in which the gas injection wells are parallel to well trajectories of the production wells for the effective oil reservoir, the second well pattern is a well pattern in which the gas injection wells cross perpendicularly to well trajectories of the production wells for the adjacent effective oil reservoirs, and in the first well pattern and the second well pattern, the gas injection wells are parallel to planar projections of well trajectories of heating wells for the effective shale, which has advantages of increasing the gas injection and oil displacement area and the sweep coefficient, and thus enhancing the recovery ratio.

In an embodiment, in the first well pattern, planar projections of the gas injection wells are parallel to planar projections of the well trajectories of the heating wells for the effective shale, and in a direction along a well trajectory of a horizontal well, a fluctuation period of a fluctuating horizontal production well for the adjacent effective oil reservoirs is consistent with a fluctuation period of the gas injection wells, but in a mirror reversal relationship.

In an embodiment, in the second well pattern, planar projections of the gas injection wells are perpendicular to planar projections of well trajectories of the heating wells for the effective shale section, the fluctuation period of the gas injection wells is the same as the fluctuation period of the fluctuating horizontal wells for the adjacent oil reservoirs, well trajectories of adjacent gas injection wells are in a mirror reversal relationship, planar projections of horizontal production wells for the adjacent effective oil reservoirs cross perpendicularly to planar projections of the heating wells for the effective shale section, a fluctuation period distance of the horizontal production wells for the adjacent effective oil reservoirs is consistent with the well spacing of the gas injection wells, planar projections of well trajectories of the fluctuating horizontal production wells for the adjacent effective oil reservoirs and planar projections of the gas injection wells (wells for injecting gas from the effective shale reservoir to the adjacent oil reservoir) are in a mirror reversal relation with respect to a middle section of the effective oil reservoir.

In a specific implementation, a well pattern of the fluctuating horizontal wells of the adjacent effective oil reservoirs to the effective shale section may adopt two patterns, one of which is that the gas injection wells are parallel to the production wells for the adjacent effective oil reservoirs (pattern 1, the first well pattern) (FIGS. 6, 7 and 8), and the other of which is that the gas injection wells cross perpendicularly to the well pattern of the production wells for the adjacent effective oil reservoirs (pattern 2, the second well pattern) (FIGS. 9, 10, 11 and 12), and in the two well patterns of the fluctuating horizontal wells, the planar projections of the gas injection wells and the heating wells for the effective shale section are in parallel. In the pattern 1, it is preferable that the planar projections of the gas injection wells are parallel to the planar projection of the heating wells for the effective shale section, the gas injection wells adopt the same fluctuation period, and the fluctuation period of the fluctuating horizontal wells of the adjacent effective oil reservoirs is consistent with that of the gas injection wells, but in a mirror reversal relationship. In the pattern 2, it is preferable that the planar projections of the gas injection wells are parallel to the planar projections of the heating wells for the effective shale section, the gas injection wells adopt the same fluctuation period, and the well trajectories of the adjacent gas injection wells are in a mirror reversal relationship. The planar projections of the horizontal production wells for the adjacent effective oil reservoirs are in a vertical orthogonal relation to the planar projections of the heating wells for the effective shale section. The fluctuation period of the horizontal production wells for the adjacent effective oil reservoirs is consistent with the well spacing of the gas injection well. The planar projections of the well trajectory of the fluctuating horizontal production wells for the adjacent effective oil reservoirs and the planar projections of the gas injection wells are in a mirror reversal relationship with respect to the middle of effective oil reservoir.

In an embodiment, the step of determining a well pattern for integrated exploitation of the effective shale and the adjacent effective oil reservoirs according to the thickness of the effective shale, the top effective boundary, the bottom effective boundary and the maximum seepage radius may include:

when the thickness of the effective shale is greater than 100 m, a vertical well pattern is adopted in heating wells and production wells for the effective shale, and the vertical well pattern is adopted both in production wells and gas injection wells of the adjacent effective oil reservoirs; and when the thickness of the effective shale is less than 100 m, a horizontal well pattern is adopted in heating wells for the effective shale, and a fluctuating horizontal well pattern or a vertical well pattern is adopted in gas injection wells and production wells for the adjacent effective oil reservoirs.

In a specific implementation, when the thickness of the effective shale is great than 100 m, a lower exploitation cost and a better benefit can be achieved by adopting vertical well than horizontal wells.

In a specific implementation, when the thickness of the effective shale section is great (preferably less than 100 m), the vertical well pattern is adopted in the heating wells and the production wells for the effective shale section, and at this time, the vertical well pattern is adopted both in the production wells and the gas injection wells of the adjacent effective oil reservoirs. Otherwise, the horizontal well pattern is adopted in the heating wells for the effective shale section, and the fluctuating horizontal well pattern or a vertical well pattern may be adopted in the gas injection wells and the production wells for the adjacent effective oil reservoirs.

In addition, in an embodiment, if there are water layers between the adjacent effective oil reservoirs above or below the effective shale section, a vertical well pattern or a fluctuating horizontal well pattern may be adopted in the production wells and the gas injection wells of the effective oil reservoir, but a casing completion approach may be adopted in the fluctuating horizontal well, and the water layer is avoided in a perforation section of the fluctuating horizontal well.

IV. Next, the above step 104 is described.

In an embodiment, the step of determining a well completion approach according to well pattern for integrated exploitation, may include:

when an average permeability range between the adjacent effective oil reservoirs is less than or equal to 3, and there is no water layer between the effective shale section and the top effective boundary of the adjacent oil reservoirs and between the effective shale section and the bottom effective boundary of the adjacent oil reservoirs, a screen pipe completion may be adopted both in the gas injection wells (wells for injecting gas from the effective shale reservoir to the adjacent oil reservoirs) and the production wells for the adjacent effective oil reservoirs.

When a fluctuating horizontal well pattern is adopted in the gas injection wells and the production wells for the adjacent effective oil reservoirs, a well section of the gas injection wells that adopts the screen pipe completion is a whole well section of the effective shale from the gas injection wells; and a well section of the production wells for the adjacent effective oil reservoirs that adopts the screen pipe completion is a whole well section of the adjacent effective oil reservoirs.

When a vertical well pattern is adopted in the production wells for the effective shale and the production wells for the adjacent effective oil reservoirs: when there is only an effective oil reservoir above the effective shale section, a screen pipe well section is from the top effective boundary of the effective oil reservoir to the bottom boundary of the effective shale; when there is only an effective oil reservoir below the effective shale, the screen pipe well section is from a top boundary of the effective shale to the bottom effective boundary of the effective oil reservoir; when there are effective oil reservoirs above and below the effective shale, the screen pipe well section is from the top effective boundary of the effective oil reservoir above the effective shale to the bottom effective boundary of the effective oil reservoir below the effective shale.

In a specific implementation, the well completion approach in the embodiment has advantages that, because the permeability range is small and the flow abilities of the fluids in the effective oil reservoir are close, adoption of the screen pipe completion can improve the oil displacement efficiency and reduce the cost.

In a specific implementation, when a non-mean value of the reservoir physical properties of the adjacent effective oil reservoirs are weak, and preferably the average permeability range between the adjacent effective oil reservoirs is less than or equal to 3, the screen pipe completion may be adopted both in the gas injection wells and the adjacent effective reservoir production well.

In a specific implementation, when a fluctuating horizontal well pattern is adopted for the gas injection wells and the production wells for the adjacent effective oil reservoirs, a well section of the gas injection wells that adopts the casing completion is a whole well section of the gas injection wells entering into the effective shale; and a well section of the production wells for the adjacent effective oil reservoirs that adopts the casing completion is a whole well section entering into the adjacent effective oil reservoir.

In a specific implementation, when a vertical well pattern is adopted for the production wells for the effective shale section and the production wells for the adjacent effective oil reservoirs: a bottom boundary of a casing well section is a bottom boundary of the effective shale in the case that there is only an effective oil reservoir above the effective shale; the bottom boundary of the casing well section is a bottom effective boundary of the effective oil reservoir in the case that there is only an effective oil reservoir below the effective shale; and the bottom boundary of the casing well section is the bottom effective boundary of the effective oil reservoir below the effective shale in the case that there are effective oil reservoirs above and below the effective shale.

In an embodiment, the step of determining a well completion approach according to well pattern for integrated exploitation, may include:

when an average permeability range between the adjacent effective oil reservoirs is greater than 3, or there are water layers between the effective shale section and the top effective boundary of the adjacent oil reservoirs and between the effective shale section and the bottom effective boundary of the adjacent oil reservoirs, and a casing completion is adopted both in the gas injection wells and the production wells for the adjacent effective oil reservoirs;

when a fluctuating horizontal well pattern is adopted in the gas injection wells and the production wells for the adjacent effective oil reservoirs, a well section of the gas injection wells that adopts the casing completion is a whole well section of the gas injection wells entering into the effective shale; and a well section of the production wells for the adjacent effective oil reservoirs that adopts the casing completion is the screen pipe completion is a whole well section entering into the adjacent effective oil reservoir;

when a vertical well pattern is adopted for the production wells for the effective shale and the production wells for the adjacent effective oil reservoirs, a screen pipe well section extends from the top effective boundary of the effective oil reservoir to the bottom boundary of the effective shale in the case that there is only an effective oil reservoir above the effective shale section; the screen pipe well section extends from a top boundary of the effective shale to the bottom effective boundary of the effective oil reservoir in the case that there is only an effective oil reservoir below the effective shale; and the screen pipe well section extends from the top effective boundary of the effective oil reservoir above the effective shale to the bottom effective boundary of the effective oil reservoir below the effective shale in the case that there are effective oil reservoirs above and below the effective shale.

In a specific implementation, when the non-mean value of the reservoir physical properties of the adjacent effective oil reservoirs to the effective shale section are strong, and preferably the average permeability range between the adjacent effective oil reservoirs is greater than 3, or there are water layers between the effective shale section and the top effective boundary of the adjacent oil reservoirs and between the effective shale section and the bottom effective boundary of the adjacent oil reservoirs, a casing completion may be adopted both in the gas injection wells and the production wells for the adjacent effective oil reservoirs.

In a specific implementation, when the fluctuating horizontal well pattern is adopted in the gas injection wells and the production wells for the adjacent effective oil reservoirs, a well section of the gas injection wells that adopts the casing completion is a whole well section of the effective shale from the gas injection wells; and a well section of the production wells for the adjacent effective oil reservoirs that adopts the casing completion is a whole well section of the adjacent effective oil reservoirs.

In a specific implementation, when a vertical well pattern is adopted in the production wells for the effective shale section and the production wells of the adjacent effective oil reservoir: when there is only an effective oil reservoir above the effective shale, a bottom boundary of a casing well section is a bottom boundary of the effective shale; when there is only an effective oil reservoir below the effective shale, a bottom boundary of a casing well section is a bottom effective boundary of the effective oil reservoir; when there are effective oil reservoirs above and below the effective shale, the bottom boundary of the casing well section is the bottom effective boundary of the effective oil reservoir below the effective shale.

In an embodiment, the step of determining a total number of perforation clusters of gas injection wells, a number of perforation clusters corresponding to each of the adjacent effective oil reservoirs, a gas injection amount per unit time of each perforation cluster, and a total gas injection amount per unit time in the gas injection wells, according to the well completion approach may include:

1. when the casing completion is adopted, determining a reservoir space volume of the effective oil reservoir and a subsurface volume of accumulated injected gas of the effective oil reservoir within a control range of the gas injection section of the gas injection wells, according to a principle of determining a casing perforation density and a total number of perforations of the gas injection wells in the adjacent effective oil reservoirs above and below the effective shale ("$V_{oil\_por}$ and $V_{injection}$" are calculated according to the following equation (2)).

2. determining the number of perforation clusters corresponding to each of the adjacent effective oil reservoirs in the casing completion approach, according to the reservoir space volume of the effective oil reservoir and the subsurface volume of the accumulated injected gas of the effective oil reservoir within the control range of the gas injection section of the gas injection well ("$V_{oil\_por}$ and $V_{injection}$" calculated from the following equation (3) and the above portion of "1", and $v_1$ calculated from the equation that is below the equation (3) are put into the equation (3) to obtain $PN_i$);

3. determining the total number of perforation clusters and the total gas injection amount of the gas injection wells according to the number of perforation clusters corresponding to each of the adjacent effective oil reservoirs in the casing completion approach ($PN_i$ obtained according to the above portion of "2" is put into the following equation (4), to solve "n").

In a specific implementation, when the casing completion is adopted, the casing perforation density and the total number of perforations of the gas injection wells in the adjacent effective oil reservoirs above and below the effective shale section are determined based on the equation (2), so as to improve the crude oil production and the recovery ratio of all effective oil reservoirs having different reservoir properties.

The casing perforation density and the total number of perforations of the gas injection wells are determined based on such a principle that, it is ensured the accumulative injected gas volume of all adjacent effective oil reservoirs is equal to an equivalent multiple of the effective reservoir space volume controlled by the adjacent effective oil reservoirs, and preferably the multiple is two in order to ensure the oil displacement efficiency of the effective oil reservoir.

$$V_{injection}/V_{oil\_por} \approx 2; \qquad (2)$$

wherein, $V_{injection}$ denotes the subsurface volume of the accumulated injected gas of the effective oil reservoir, m³; $V_{oil\_por}$ denotes the reservoir space volume of the effective oil reservoir controlled by the gas injection section of the gas injection wells, m³;

wherein, $V_{oil\_por} = H_e \times A_e \times \varphi_e$;

$H_e$ denotes the thickness of the effective oil reservoir, m; $A_e$ denotes an area of the effective oil reservoir controlled by the gas injection section of the gas injection wells, m²; $\varphi_e$ denotes an effective reservoir porosity of the effective oil reservoir within the area of the effective oil reservoir controlled by the gas injection section of the gas injection wells, decimal.

The adjacent effective oil reservoirs have different reservoir physical properties and fluid viscosity, and the fluid has different flow abilities in the reservoirs. In order to ensure that different adjacent effective oil reservoirs have the same gas injection oil displacement efficiency, i.e., the injected gas volume is consistent with the multiple of the effective pore volume ratio of the effective oil reservoir, and the number of perforations of the gas injection wells in the casing completion approach is determined by the equation (3). The perforation positions of the gas injection wells are located in the corresponding adjacent effective oil reservoir section.

$$(v_i \times PN_i) \Big/ \sum_{i=1}^{n}(V_i \times PN_i) = (V_{oil\_por\_i}) \Big/ \sum_{i=1}^{n} V_{oil\_por\_i} \qquad (3)$$

wherein, $v_1$ denotes a gas injection amount per unit time of each perforation cluster in the ith effective reservoir at a difference between the fracture pressure and the formation pressure of the adjacent effective oil reservoirs, m³/s; $PN_i$ denotes the corresponding number of clusters of perforations of the gas injection wells of the ith effective oil reservoir, cluster; $V_{oil\_por\_i}$ denotes the effective reservoir space volume within the control range of the maximum seepage radius of the ith effective oil reservoir, m³.

Wherein the gas injection amount per unit time of each perforation cluster in the ith effective reservoir is determined by:

$$v_i = \frac{K_{r\_Lg\_i}}{\mu_{Lg\_i}}(\Delta p_i - G_i \times R_i)$$

$K_{r\_Lg\_i}$ denotes a fluid relative permeability of the ith effective oil reservoir, decimal; $\mu_{Lg\_i}$ denotes a fluid viscosity of the ith effective oil reservoir, Pa·s; $\Delta p_i$ denotes a difference between the gas injection pressure and the formation pressure of the ith effective oil reservoir, MPa; $R_i$ denotes a seepage radius of the well-controlled perforation section of the ith effective oil reservoir, m; $G_i$ denotes the starting pressure gradient of a reservoir where the ith effective oil reservoir is located, MPa/m.

The total number of perforations of the gas injection wells must be kept within a reasonable range to ensure a certain gas injection pressure. The total number of perforations of the gas injection wells is determined according to the equation (4).

$$Q_{inj\_gas} = \sum_{i=1}^{n}(v_i \times PN_i) \quad (4)$$

Wherein, $Q_{inj\_gas}$ (a total gas injection amount is known: the known gas injection amount is obtained based on the heating volume of the effective shale section and the well spacing of the gas injection well) denotes the total gas injection amount per time unit of the gas injection wells at a difference between the fracture pressure and the formation pressure of the adjacent effective oil reservoirs, m³/s; $v_i$ denotes the gas injection amount per unit time of each perforation cluster in the ith effective reservoir at a difference between the fracture pressure and the formation pressure of the adjacent effective oil reservoirs; and $PN_i$ denotes the number of clusters of the corresponding perforation of the gas injection wells of the ith effective oil reservoir, m³/s. The total number n of clusters of perforations of the gas injection wells is determined according to the equation (4), and then the number of clusters of corresponding perforation of each of the adjacent effective oil reservoirs is determined according to the equation (3).

In an embodiment, the step of determining a well completion approach according to well pattern for integrated exploitation; and determining a total number of perforation clusters of gas injection wells, a number of perforation clusters corresponding to each of the adjacent effective oil reservoirs, a gas injection amount per unit time of each perforation cluster, and a total gas injection amount per unit time of the gas injection wells, according to the well completion approach may include that:

a well completion time of the production wells for the adjacent effective oil reservoirs is prior to heating of the effective shale section;

when a fluctuating horizontal well exploitation approach is adopted, an upper sealing mode of the gas injection well section is adopted in the gas injection wells during the well completion;

when the casing completion is adopted in the production wells for the adjacent effective oil reservoirs, a complete perforation mode is adopted in the effective oil reservoir; and when the casing completion is adopted in the production wells for the adjacent effective oil reservoirs, the water layer is avoided in a perforation section.

In a specific implementation, the well completion time of the production wells for the adjacent effective oil reservoirs is prior to heating of the effective shale section. When a fluctuating horizontal well deployment mode is adopted in exploitation, a mode in which wells above the gas injection well section are sealed is adopted when the gas injection wells are completed. When the casing completion is adopted in the production wells of the adjacent effective oil reservoir section, a complete perforation mode is adopted in the effective oil reservoir section, to increase a discharge area of the effective oil reservoir. When a casing completion is adopted in the production wells of the adjacent effective oil reservoir section, the water layer is avoided in the perforation section, i.e., the water layer section does not perforate. In the heating process of the effective shale section, toxic gas such as hydrogen sulfide or the like may be generated. Drilling and well completion of the adjacent oil reservoirs are completed before heating, so as to reduce the risk of safety accidents and facilitate the field operation.

V. Next, the step 105 following the step 104 is described.

In an embodiment, the method for determining an integrated exploitation approach of shale and adjacent oil reservoirs may further comprise: determining a shut-down time of the production wells for the effective shale, and a gas injection time, a gas injection amount and a start-up time and a shut-down time of the production wells for the adjacent effective oil reservoirs, based on oil and gas yields of the production wells for the effective shale.

The step of determining a shut-down time of the production wells for the effective shale, and a gas injection time, a gas injection amount and a start-up time and a shut-down time of the production wells for the adjacent effective oil reservoirs, according to oil and gas yields of the production wells for the effective shale may include:

when a cumulative oil yield of the production wells for the effective shale reaches 90% (preferably 98%) of a final oil yield, or when a cumulative gas-oil ratio of the production wells for the effective shale is greater than 500 (preferably more than 900), or when a monthly gas-oil ratio of the production wells for the effective shale is greater than 2000 (preferably more than 4000), shutting down the production wells for the effective shale, and determining the shut-down time of the production wells for the effective shale.

The following describes determination of the above-mentioned "oil and gas yield of the production wells for the effective shale" and the various parameters in this step have been obtained in the above-mentioned step 101.

In an embodiment, the prediction model of oil yield produced in shale in-situ exploitation may be determined as:

$$Q_{PO} = f(a) \times L_{heater}^2 \times H_{shale} \times TOC \times HI \times \rho \quad (5)$$

$$f(a) = 10^{-8} \times (a_{51} \times T_{centre}^3 + a_{52} \times T_{centre}^2 + a_{53} \times T_{centre} \times a_{54})$$

wherein, $Q_{PO}$ denotes the oil yield of the well-controlled area of the production wells for the effective shale reservoir in the in-situ conversion of the shale, m³; $L_{heater}$ denotes the well spacing of the heating wells for the effective shale reservoir, m; $H_{shale}$ denotes the thickness of the effective shale, m; TOC denotes an average total organic carbon content of the effective shale, wt %; HI denotes an average hydrogen index of the effective shale, mg/g·TOC; $\rho$ denotes an average density of the effective shale, g/cm³; $T_{heater}$ denotes a temperature at a central point of a connection line between the heating wells for the effective shale reservoir (obtained by detecting the well temperature in measurement), °C.; $a_{51}$, $a_{52}$, $a_{53}$, $a_{54}$ denote empirical coefficients, which may be −0.000028, −0.027439, 8.818674, 418.585965, respectively.

In an embodiment, the prediction model of gas yield produced by in-situ exploitation of shale may be:

$$Q_{Pg} = 10^{-5} \times a_{61} \times T_{centre}^{b61} \times L_{heater}^2 \times H_{shale} \times TOC \times HI \times \rho \quad (6)$$

wherein, $Q_{Pg}$ denotes the gas yield of the well-controlled area of the production wells for the effective shale reservoir in the in-situ conversion of the shale, m³; $L_{heater}$ denotes the well spacing of the heating wells for the effective shale reservoir, m; $H_{shale}$ denotes a thickness of the effective shale, m; TOC denotes an average total organic carbon content of the effective shale, wt %; HI denotes an average hydrogen index of the effective shale, mg/g·TOC; $\rho$ denotes an average density of the effective shale, g/cm³; $T_{heater}$ denotes a temperature at a central point of a connection line between the heating wells for the effective shale reservoir (obtained by detecting a well temperature in measurement), ° C.; $a_{61}$, $b_{61}$ denote empirical coefficients, which may be 0.01157, 1.99449, respectively.

In an embodiment, the prediction model of gas-oil ratio produced in in-situ exploitation of shale may be:

$$GOR = a_{71} \times e^{b_{71} \times T_{centre}} \quad (7)$$

wherein, GOR denotes an oil-gas ratio of the production wells for the effective shale reservoir produced in the in-situ conversion of the shale, m³/m³; $T_{heater}$ denotes a temperature at a central point of a connection line between the heating wells for the effective shale reservoir (obtained by detecting the well temperature in measurement), ° C.; $a_{71}$, $b_{71}$ denote empirical coefficients, which may be 0.28451, 0.0449, respectively. In an embodiment, the shut-down time of the production wells for the effective shale, as well as the gas injection time, the gas injection amount, and the start-up time and the shut-down time of production wells for the adjacent effective oil reservoirs are determined according to the prediction models of the oil yield, the gas yield, the gas-oil ratio produced in the in-situ conversion of the shale that are obtained from the equations (5), (6) and (7), as well as the oil yield, the gas yield and the gas-oil ratio produced in the actual production.

After the production wells for the effective shale are shut down, a gas injection is started on the adjacent effective oil reservoirs by using natural gas generated from the effective shale, and the gas injection time, the gas injection amount and the start-up time and the shut-down time of the production wells for the adjacent effective oil reservoirs are determined.

In an embodiment, the step of after the production wells for the effective shale is shut down, starting to inject gas into the adjacent effective oil reservoirs by using natural gas generated by the effective shale, and determining the gas injection time, the gas injection amount and the start-up time and the shut-down time of the production wells for the adjacent effective oil reservoirs may include:

when a gas amount generated in the effective shale satisfies a requirement of a lower limit of a minimum cumulative gas injection amount for oil displacement of the adjacent effective oil reservoirs, and a value of daily oil and gas yields of a single well of the adjacent effective oil reservoirs is equal to a daily operation cost of the single well, finishing a production of the production wells for the adjacent effective oil reservoirs, and determining the gas injection time, the gas injection amount and the start-up time and the shut-down time of the production wells for the adjacent effective oil reservoirs; and when a gas amount generated in-situ conversion in the effective shale section does not satisfy a requirement of a lower limit of a minimum cumulative gas injection amount for oil displacement of the adjacent effective oil reservoirs, continually performing a gas injection and exploitation on the adjacent effective oil reservoirs by using the production wells for the effective shale in a gas injection mode until a value of daily oil and gas yields of a single well of the adjacent effective oil reservoirs is equal to a daily operation cost of the single well, finishing a production of the production wells for the adjacent effective oil reservoirs, and determining the gas injection time, the gas injection amount and the start-up time and the shut-down time of the production wells for the adjacent effective oil reservoirs.

In a specific implementation, when the cumulative oil and gas yield of the production wells for the effective shale section reach a certain amount, the production wells for the effective shale section are shut down. The gas injection into the adjacent effective oil reservoirs is started using the natural gas generated in the effective shale section, i.e., the production enters the gas injection exploitation stage of the adjacent effective oil reservoirs. Preferably, when a cumulative oil yield of the production wells for the effective shale section reaches 90% (preferably 98%) of a final oil yield, or when a cumulative gas-oil ratio of the production wells for the effective shale section is greater than 500 (preferably 900), or when a monthly gas-oil ratio of the production wells for the effective shale section is greater than 2000 (preferably 4000) (FIGS. 13 and 14), the production wells for the effective shale section are shut down, and the production enters the stage of gas injection into the adjacent effective oil reservoirs. When the gas amount generated in the effective shale section can satisfy the requirement of the lower limit of the minimum cumulative gas injection amount for the oil displacement of the adjacent effective oil reservoirs, and preferably a ratio of the cumulative injected gas volume of the adjacent effective oil reservoirs to the well-controlled effective reservoir space volume of the oil reservoir is 2, until the value of the daily oil and gas yield of a single well of the adjacent effective oil reservoirs is equal to the daily operation cost of the single well, a production of the production wells for the adjacent effective oil reservoirs is finished.

In a specific implementation, when the gas yield in the in-situ conversion of the effective shale section cannot satisfy a requirement of a lower limit of a minimum cumulative gas injection amount for oil displacement of the adjacent effective oil reservoirs, a gas injection and exploitation on the adjacent effective oil reservoirs is continually performed by using the production wells for the effective shale section in the gas injection mode, and preferably when the accumulative gas yield of the effective shale section reaches 98%, the production wells for the effective shale section enter the manually gas injection stage. Until the value of the daily oil and gas yield of a single well of the adjacent effective oil reservoirs is equal to the daily operation cost of the single well, the production of the production wells for the adjacent effective oil reservoirs is finished. A wellhead gas injection pressure of the production wells for the effective shale section should be lower than a fracture pressure of the adjacent effective oil reservoirs subtracted by the wellbore gas column pressure. The injection gas of the production wells for the effective shale section may be hydrocarbon gas, nitrogen gas, carbon dioxide and the like, and preferably may be hydrocarbon gas.

Based on the same inventive concept, the embodiment of the present disclosure further provides an apparatus for determining an integrated exploitation approach for a shale and adjacent oil reservoirs, as described in the following embodiment. Since the principle based on which the apparatus for determining an integrated exploitation approach for a shale and adjacent oil reservoirs solves problems is similar to the method for determining an integrated exploitation approach for a shale and adjacent oil reservoirs, the implementation of the apparatus for determining an integrated exploitation approach for a shale and adjacent oil reservoirs can refer to the implementation of the method for determining an integrated exploitation approach for a shale and adjacent oil reservoirs, which will not be repeated in detail. As used below, the term "unit" or "module" can realize a combination of software and/or hardware with predetermined functions. Although the apparatus described in the following embodiment is preferably implemented by software, implementation by hardware, or combination of software and hardware is also possible and conceivable.

Figure 16:
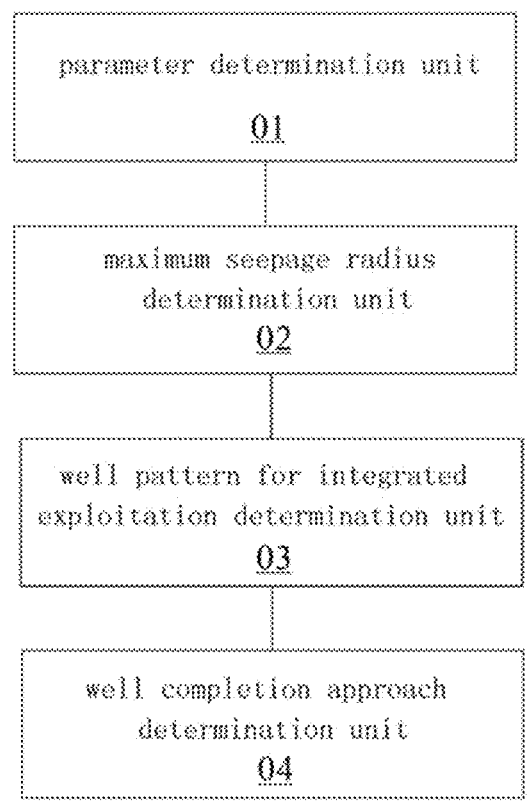
FIG. 16 is a flow schematic diagram of an apparatus for determining an integrated exploitation approach for a shale and adjacent oil reservoirs according to an embodiment of the present disclosure.

FIG. 16 is a flow schematic diagram of an apparatus for determining an integrated exploitation approach for a shale and adjacent oil reservoirs according to an embodiment of the present disclosure. As shown in FIG. 16, the apparatus comprises:

a parameter determination unit 01 configured to determine a thickness of an effective shale, thicknesses of adjacent effective oil reservoirs to the effective shale, and a planar distribution area of the effective shale and the adjacent effective oil reservoirs to the effective shale, based on logging data of a target reservoir of interest; and determine a top effective boundary of the adjacent effective oil reservoirs above the effective shale, and a bottom effective boundary of the adjacent effective oil reservoirs below the effective shale, based on the thickness of the effective shale, the thicknesses of the adjacent effective oil reservoirs to the effective shale, and the planar distribution area of the effective shale and the adjacent effective oil reservoirs to the effective shale;

a maximum seepage radius determination unit 02 configured to determine a maximum seepage radius of each of the adjacent effective oil reservoirs to the effective shale based on a formation pressure, a fracture pressure and a starting pressure gradient of the adjacent effective oil reservoirs to the effective shale;

a well pattern determination unit 03 configured to determine a well pattern for integrated exploitation of the effective shale and the adjacent effective oil reservoirs based on the thickness of the effective shale, the top effective boundary, the bottom effective boundary and the maximum seepage radius;

a well completion approach determination unit 04 configured to determine a well completion approach according to the well pattern for integrated exploitation; and determine a total number of perforation clusters of gas injection wells, a number of perforation clusters corresponding to each of the adjacent effective oil reservoirs, a gas injection amount per unit time of each perforation cluster, and a total gas injection amount per unit time of the gas injection wells, according to the well completion approach;

wherein the effective shale is in communication with all the adjacent effective oil reservoirs by boring-through of a fluctuating horizontal well or vertical well.

In an embodiment, the effective shale satisfies a first preset condition that: a kerogen type of the shale is one or a combination of a type I and a type II, a total organic carbon content (TOC) is greater than 4%-6%, and a vitrinite reflectance (Ro) is less than 0.95%;

the effective shale satisfies a second preset condition that: a thickness of continuous shale with kerogen type, TOC and Ro satisfying the first preset condition is greater than 8 m; or, a thickness of a single reservoir of shale with kerogen type, TOC and Ro satisfying the first preset condition is greater than 3 m, a thickness of a section not satisfying the first preset condition between the effective shales is less than 1 m, and a cumulative thickness of the effective shales satisfying the first preset condition is greater than 10 m; or, a cumulative thickness of the effective shales with kerogen type, TOC and Ro satisfying the first preset condition is greater than 8 m, and a ratio of the cumulative thickness of the effective shales satisfying the first preset condition to a thickness of a formation where the effective shales are located is more than 80%;

the adjacent effective oil reservoirs satisfy a third preset condition that: an effective porosity of the adjacent effective oil reservoirs is greater than a porosity lower limit, a permeability of the adjacent effective oil reservoirs is greater than a permeability lower limit, and an oil saturation of the adjacent effective oil reservoirs is greater than an oil saturation lower limit.

In an embodiment, the maximum seepage radius determination unit 02 is specifically configured for:

determining the maximum seepage radius of the adjacent effective oil reservoirs according to the following equation:

$$R=(P_b-P_f)/G;$$

wherein, R denotes the maximum seepage radius; $P_b$ denotes the fracture pressure of a reservoir where the oil reservoir is located; $P_f$ denotes the formation pressure of a reservoir where the oil reservoir is located; and G denotes the starting pressure gradient of a reservoir where the oil reservoir is located.

In an embodiment, the well pattern determination unit is specifically configured for: determining a well distance between the gas injection wells and production wells in an effective oil reservoir according to the maximum seepage radius of the reservoir where the effective oil reservoir is located, wherein the well distance between the gas injection wells and the production wells in the effective oil reservoir is less than or equal to the maximum seepage radius.

In an embodiment, the well pattern determination unit is specifically configured for:

when a first distance between the effective shale and the top effective boundary or a second distance between the effective shale and the bottom effective boundary is less than or equal to a vertical fluctuation distance of the fluctuating horizontal wells, or a first distance top boundary effective oil reservoir accounts for 30% or lower, or a second distance bottom boundary effective oil reservoir accounts for 30% or lower, adopting a fluctuating horizontal well pattern in the production wells and the gas injection wells of the adjacent effective oil reservoirs; a fluctuation period of a well trajectory of the fluctuating horizontal wells being less than or equal to four times of the maximum seepage radius of a reservoir where the effective oil reservoir is located.

In an embodiment, the well pattern determination unit is specifically configured for: using N+1.5 times of a distance between horizontal production wells of an effective shale section is used as a basis for designing a well spacing trajectory of the gas injection wells (i.e., fluctuating horizontal wells) of the effective oil reservoir, wherein N is an integer.

In an embodiment, the fluctuating horizontal well pattern of the adjacent effective oil reservoirs comprises: a first well pattern and a second well pattern; wherein the first well pattern is a well pattern in which the gas injection wells are parallel to well trajectories of the production wells for the effective oil reservoir, the second well pattern is a well pattern in which the gas injection wells cross perpendicularly to well trajectories of the production wells for the adjacent effective oil reservoirs, and in the first well pattern and the second well pattern, the gas injection wells are parallel to planar projections of well trajectories of heating wells for the effective shale.

In an embodiment, in the first well pattern, planar projections of the gas injection wells are parallel to planar projections of the well trajectories of the heating wells for the effective shale, and in a direction along a well trajectory of a horizontal well, a fluctuation period of a fluctuating horizontal production well for the adjacent effective oil reservoirs is consistent with a fluctuation period of the gas injection wells, but in a mirror reversal relationship.

In an embodiment, in the second well pattern, planar projections of the gas injection wells are perpendicular to planar projections of well trajectories of the heating wells for the effective shale section, the fluctuation period of the gas injection wells is the same as the fluctuation period of the fluctuating horizontal wells for the adjacent oil reservoirs, well trajectories of adjacent gas injection wells are in a mirror reversal relationship, planar projections of horizontal production wells for the adjacent effective oil reservoirs cross perpendicularly to planar projections of the heating wells for the effective shale section, a fluctuation period of the horizontal production wells for the adjacent effective oil reservoirs is consistent with a well spacing of the gas injection wells, planar projections of well trajectories of the fluctuating horizontal production wells for the adjacent effective oil reservoirs and planar projections of the gas injection wells are in a mirror reversal relation with respect to a middle section of the effective oil reservoir.

In an embodiment, the well pattern determination unit is specifically configured for:

adopting a vertical well pattern for the production wells and the gas injection wells for the adjacent effective oil reservoirs, when a first distance between the effective shale and the top effective boundary or a second distance between the effective shale and the bottom effective boundary is greater than a vertical fluctuation distance of the fluctuating horizontal wells, and a first distance top boundary effective oil reservoir accounts for 30% or higher or a second distance bottom boundary effective oil reservoir accounts for 30% or higher;

adopting a quasi-five-point vertical well pattern for the production wells for the effective shale and the production wells for the adjacent effective oil reservoirs, when the vertical well pattern is adopted for the production wells and the gas injection wells for the adjacent effective oil reservoirs, wherein the quasi-five-point vertical well pattern is a well patter in which four production wells for the effective shale form a first rectangle or square, and the production well for the adjacent effective oil reservoirs is located in a center of the first rectangle or square; or, four production wells for the adjacent effective oil reservoirs form a second rectangle or square, and the production well for the effective shale section is located in a center of the second rectangle or square.

In an embodiment, the well pattern determination unit is specifically configured for:

adopting a vertical well pattern for heating wells and production wells for the effective shale, and adopting a vertical well pattern for both the production wells and the gas injection wells for the adjacent effective oil reservoirs, when the thickness of the effective shale is greater than 100 m; and adopting a horizontal well pattern for heating wells for the effective shale, and adopting a fluctuating horizontal well pattern or a vertical well pattern for the gas injection wells and the production wells for the adjacent effective oil reservoirs, when the thickness of the effective shale is less than 100 m.

In an embodiment, the well completion approach determination unit is specifically configured for:

adopting a screen pipe completion for both the gas injection wells and the production wells for the adjacent effective oil reservoirs, when an average permeability range among the adjacent effective oil reservoirs is less than or equal to 3, and there is no water layer between the effective shale section and the top effective boundary of the adjacent oil reservoirs and between the effective shale section and the bottom effective boundary of the adjacent oil reservoirs;

wherein when a fluctuating horizontal well pattern is adopted for the gas injection wells and the production wells for the adjacent effective oil reservoirs, a well section of the gas injection wells that adopts the screen pipe completion is a whole well section of the gas injection wells entering into the effective shale; and a well section of the production wells for the adjacent effective oil reservoirs that adopts the screen pipe completion is a whole well section entering into the adjacent effective oil reservoir;

wherein when a vertical well pattern is adopted for the production wells for the effective shale and the production wells for the adjacent effective oil reservoirs, a screen pipe well section extends from the top effective boundary of the effective oil reservoir to the bottom boundary of the effective shale in the case that there is only an effective oil reservoir above the effective shale section; the screen pipe well section extends from a top boundary of the effective shale to the bottom effective boundary of the effective oil reservoir in the case that there is only an effective oil reservoir below the effective shale; and the screen pipe well section extends from the top effective boundary of the effective oil reservoir above the effective shale to the bottom effective boundary of the effective oil reservoir below the effective shale in the case that there are effective oil reservoirs above and below the effective shale.

In an embodiment, the well completion approach determination unit is specifically configured for:

adopting a casing completion for both the gas injection wells and the production wells for the adjacent effective oil reservoirs, when an average permeability range among the adjacent effective oil reservoirs is greater than 3, or there are water layers between the effective shale section and the top effective boundary of the adjacent oil reservoirs and between the effective shale section and the bottom effective boundary of the adjacent oil reservoirs;

wherein when a fluctuating horizontal well pattern is adopted for the gas injection wells and the production wells for the adjacent effective oil reservoirs, a well section of the gas injection wells that adopts the casing completion is a whole well section of the gas injection wells entering into the effective shale; and a well section of the production wells for the adjacent effective oil reservoirs that adopts the casing completion is a whole well section entering into the adjacent effective oil reservoir;

when a vertical well pattern is adopted for the production wells for the effective shale section and the production wells for the adjacent effective oil reservoirs: a bottom boundary of a casing well section is a bottom boundary of the effective shale in the case that there is only an effective oil reservoir above the effective shale; the bottom boundary of the casing well section is a bottom effective boundary of the effective oil reservoir in the case that there is only an effective oil reservoir below the effective shale; and the bottom boundary of the casing well section is the bottom effective boundary of the effective oil reservoir below the effective shale in the case that there are effective oil reservoirs above and below the effective shale.

In an embodiment, the well completion approach determination unit is specifically configured for:

determining, in the case that a casing completion is adopted, a reservoir space volume of the effective oil reservoir and a subsurface volume of accumulated injected gas in the effective oil reservoir within a control range of the gas injection section of the gas injection wells, according to a principle of determining a casing perforation density and a total number of perforations of the gas injection wells in the adjacent effective oil reservoirs above and below the effective shale;

determining the number of perforation clusters corresponding to each of the adjacent effective oil reservoirs in the casing completion, based on the reservoir space volume of the effective oil reservoir and the subsurface volume of the accumulated injected gas of the effective oil reservoir within the control range of the gas injection section of the gas injection wells; and determining the total number of perforation clusters and the total gas injection amount of the gas injection wells based on the number of perforation clusters corresponding to each of the adjacent effective oil reservoirs in the casing completion.

In an embodiment, determining, in the case that the casing completion is adopted, the reservoir space volume of the effective oil reservoir and the subsurface volume of accumulated injected gas in the effective oil reservoir within the control range of the gas injection section of the gas injection wells according to the principle of determining the casing perforation density and the total number of perforations of the gas injection wells in the adjacent effective oil reservoirs above and below the effective shale comprises: determining the reservoir space volume of the effective oil reservoir and the subsurface volume of the accumulated injected gas of the effective oil reservoir within the control range of the gas injection section of the gas injection wells according to the following equation:

$$V_{injection}/V_{oil\_por} \approx 2;$$

wherein, $V_{injection}$ denotes the subsurface volume of the accumulated injected gas of the effective oil reservoir; and $V_{oil\_por}$ denotes the reservoir space volume of the effective oil reservoir within the control of the gas injection section of the gas injection well;

wherein $V_{oil\_por} = H_e \times A_e \times \varphi_e$;

$H_e$ denotes a thickness of the effective oil reservoir; $A_e$ denotes an area of the effective oil reservoir controlled by the gas injection section of the gas injection well; and $\varphi_e$ denotes an effective reservoir porosity of the effective oil reservoir within the area of the effective oil reservoir within the control range of the gas injection section of the gas injection well.

In an embodiment, determining the number of perforation clusters corresponding to each of the adjacent effective oil reservoirs in the casing completion according to the reservoir space volume of the effective oil reservoir and the subsurface volume of the accumulated injected gas of the effective oil reservoir within the control range of the gas injection section of the gas injection wells comprises: determining the number of perforation clusters corresponding to each of the adjacent effective oil reservoirs in the casing completion according to the following equation:

$$(v_i \times PN_i) / \sum_{i=1}^{n} (v_i \times PN_i) = (V_{oil\_por\_i}) / \sum_{i=1}^{n} V_{oil\_por\_i};$$

wherein, $v_i$ denotes a gas injection amount per unit time of each perforation cluster in the ith effective reservoir at a difference between the fracture pressure and the formation pressure of the adjacent effective oil reservoirs; $PN_i$ denotes the corresponding number of clusters of perforations of the gas injection wells of the ith effective oil reservoir; $V_{oil\_por\_i}$ denotes the effective reservoir space volume of the ith effective oil reservoir;

wherein the gas injection amount per unit time of each perforation cluster in the ith effective reservoir is determined by:

$$v_i = \frac{K_{r\_Lg\_i}}{\mu_{Lg\_i}} (\Delta p_i - G_i \times R_i);$$

$K_{r\_Lg\_i}$ denotes a fluid relative permeability of the ith effective oil reservoir; $\mu_{Lg\_i}$ denotes a fluid viscosity of the ith effective oil reservoir; $\Delta p_i$ denotes a difference between the formation pressure and the gas injection pressure of the ith effective oil reservoir; $R_i$ denotes a seepage radius of a well-controlled perforation section of the ith effective oil reservoir; and $G_i$ denotes the starting pressure gradient of a reservoir where the ith effective oil reservoir is located.

In an embodiment, determining the total number of perforation clusters and the total gas injection amount of the gas injection wells based on the number of perforation clusters corresponding to each of the adjacent effective oil reservoirs in the casing completion comprises: determining the total number of perforation clusters and the total gas injection amount of the gas injection wells according to the following equation:

$$Q_{inj\_gas} = \sum_{i=1}^{n} (v_i \times PN_i);$$

wherein, $Q_{inj\_gas}$ denotes the total gas injection amount per time unit of the gas injection wells, with a difference between the fracture pressure and the formation pressure of the adjacent effective oil reservoirs; $v_i$ denotes the gas injection amount per unit time of each perforation cluster in the ith effective reservoir, with a difference between the fracture pressure and the formation pressure of the adjacent effective oil reservoirs; and $PN_i$ denotes the number of clusters of the corresponding perforation of the gas injection wells of the ith effective oil reservoir.

In an embodiment, the well completion approach determination unit is specifically configured for that:

a well completion of the production wells for the adjacent effective oil reservoirs is prior to heating of the effective shale section;

when a fluctuating horizontal well exploitation approach is adopted, an upper sealing mode of the gas injection well section is adopted for the gas injection wells during the well completion;

when a casing completion is adopted for the production wells for the adjacent effective oil reservoirs, a complete perforation mode is adopted for the effective oil reservoir; and when the casing completion is adopted for the production wells for the adjacent effective oil reservoirs, a perforation section avoids any water layer.

In an embodiment, the above described apparatus for determining an integrated exploitation approach of shale and adjacent oil reservoirs may further comprise: a production parameter determination unit for determining a shut-down time of the production wells for the effective shale, and a gas injection time, a gas injection amount and a start-up time and a shut-down time of the production wells for the adjacent effective oil reservoirs, according to oil and gas yields of the production wells for the effective shale.

In an embodiment, the production parameter determination unit may specifically be configured for:

determining to shut down the production wells for the effective shale, and determining the shut-down time of the production wells for the effective shale, when a cumulative oil yield of the production wells for the effective shale reaches 90% of a final oil yield, or when a cumulative gas-oil ratio of the production wells for the effective shale is greater than 500, or when a monthly gas-oil ratio of the production wells for the effective shale is greater than 2000; and determining to start injecting gas into the adjacent effective oil reservoirs by using natural gas produced from the effective shale, and determining the gas injection time, the gas injection amount and the start-up time and the shut-down time of the production wells for the adjacent effective oil reservoirs, after the production wells for the effective shale are shut down.

In an embodiment, after the production wells for the effective shale is shut down, starting to inject gas into the adjacent effective oil reservoirs by using natural gas generated by the effective shale, and determining the gas injection time, the gas injection amount and the start-up time and the shut-down time of the production wells for the adjacent effective oil reservoirs comprises:

finishing a production of the production wells for the adjacent effective oil reservoirs, and determining the gas injection time, the gas injection amount and the start-up time and the shut-down time of the production wells for the adjacent effective oil reservoirs, when a gas amount generated in the effective shale satisfies a lower limit requirement of a minimum cumulative gas injection amount for oil displacement of the adjacent effective oil reservoirs, and after a value of daily oil and gas yields of a single well of the adjacent effective oil reservoirs becomes equal to a daily operation cost of the single well; and continuing exploitation of the adjacent effective oil reservoirs by injecting gas produced from the production wells for the effective shale, when a gas amount generated by in-situ conversion in the effective shale section does not satisfy the lower limit requirement of the minimum cumulative gas injection amount for oil displacement of the adjacent effective oil reservoirs, and determining to finish production of the production wells for the adjacent effective oil reservoirs, and determining the gas injection time, the gas injection amount and the start-up time and the shut-down time of the production wells for the adjacent effective oil reservoirs, after the value of daily oil and gas yields of the single well of the adjacent effective oil reservoirs becomes equal to the daily operation cost of the single well.

Embodiments of the present disclosure also provide a computer device comprising a memory, a processor, and a computer program stored in the memory and executable by the processor, wherein the processor implements, when executing the computer program, the method for determining an integrated exploitation approach for a shale and adjacent oil reservoirs as described above.

Embodiments of the present disclosure also provide a computer readable storage medium storing therein a computer program for performing the method for determining an integrated exploitation approach for a shale and adjacent oil reservoirs as described above.

The technical solution provided by the embodiments of the present disclosure achieves the following beneficial technical effects:

compared with the existing solutions of realizing exploitation of a shale and adjacent oil reservoirs by utilizing the horizontal well volume fracturing technique, in the technical solution provided in the embodiments of the present disclosure, the effective shale is in bore-through communication with all the adjacent effective oil reservoirs by using a fluctuating horizontal well or a vertical well, and the technical solution of the present disclosure is implemented by: determining a thickness of an effective shale, thicknesses of adjacent effective oil reservoirs to the effective shale, and a planar distribution area of the effective shale and the adjacent effective oil reservoirs to the effective shale, according to logging data of a target reservoir of interest; determining a top effective boundary of the adjacent effective oil reservoirs above the effective shale, and a bottom effective boundary of the adjacent effective oil reservoirs below the effective shale, according to the thickness of the effective shale, the thicknesses of the adjacent effective oil reservoirs to the effective shale, and the planar distribution area of the effective shale and the adjacent effective oil reservoirs to the effective shale; determining a maximum seepage radius of each of the adjacent effective oil reservoirs to the effective shale according to a formation pressure, a fracture pressure and a starting pressure gradient of the adjacent effective oil reservoirs to the effective shale; determining a well pattern for integrated exploitation of the effective shale and the adjacent effective oil reservoirs according to the thickness of the effective shale, the top effective boundary, the bottom effective boundary and the maximum seepage radius; determining a well completion approach according to the well pattern for integrated exploitation; and determining a total number of perforation clusters of gas injection wells, a number of perforation clusters corresponding to each of the adjacent effective oil reservoirs, a gas injection amount per unit time of each perforation cluster, and a total gas injection amount per unit time of the gas injection wells, according to the well completion approach, thereby achieving an efficient integrated exploitation of a shale and adjacent oil reservoirs, improving the recovery ratio of adjacent oil reservoirs, and providing a scientific guidance for the integrated exploitation of a shale and adjacent oil reservoirs.

Persons skilled in the art should understand that, the embodiments of the present disclosure can be provided as a method, a system or a computer program product. Therefore, the present disclosure can adopt the forms of a full hardware embodiment, a full software embodiment, or combination of a software embodiment and a hardware embodiment. Moreover, the present disclosure can adopt the form of a computer program product that is implemented on one or more computer-usable storage medium (including but not limited to a disk memory, a CD-ROM, an optical memory, etc.) including computer-usable program codes.

The disclosure is described with reference to flow diagrams and/or block diagrams of the method, the device (system) and the computer program product according to the embodiment of the disclosure. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program commands can also be stored in a computer-readable memory that can guide a computer or other programmable data processing device to operate in a special way, so that the commands stored in the computer-readable memory generate a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the commands executed on the computer or other programmable data processing device are provided for being used in the steps of achieving functions designated in one or more flows in the flow diagrams and/or one or more blocks in the block diagrams.

The foregoing is merely preferred embodiments of the present disclosure and is not intended to limit the present disclosure, and various modifications and variations can be made to the embodiments of the present disclosure by those skilled in the art. Any modifications, equivalents, improvements, etc. made within the spirit and principle of the present disclosure are intended to be included within the protection scope of the present disclosure.

What is claimed is:

1. A method for determining an integrated exploitation approach for a shale and adjacent oil reservoirs, comprising:
    collecting logging data of a target reservoir of interest comprising the shale and adjacent oil reservoirs by a logging instrument and determining a thickness of the shale, thicknesses of the adjacent oil reservoirs to the shale, and a planar distribution area of the shale and the adjacent oil reservoirs;
    determining a top boundary of the adjacent oil reservoir above the shale, and a bottom boundary of the adjacent oil reservoir below the shale, based on the thickness of the shale, the thicknesses of the adjacent oil reservoirs to the shale, and the planar distribution area of the shale and the adjacent oil reservoirs;
    acquiring a formation pressure, a fracture pressure, and a starting pressure gradient for starting fluid seep of the adjacent oil reservoirs, and determining a maximum seepage radius of each of the adjacent oil reservoirs based on the formation pressure, the fracture pressure and the starting pressure gradient that are acquired;
    determining a well pattern for integrated exploitation of the shale and the adjacent oil reservoirs, and using a fluctuating horizontal well or a vertical well to bore through the shale and the adjacent oil reservoirs, based on the thickness of the shale, the top boundary, the bottom boundary, and the maximum seepage radius;
    determining a well completion approach according to the well pattern for integrated exploitation;
    determining a total number of perforation clusters of gas injection wells, a number of perforation clusters corresponding to each of the adjacent oil reservoirs, a gas injection amount per unit time of each of the perforation clusters, and a total gas injection amount per unit time of the gas injection wells, according to the well completion approach; and
    using production wells and gas injection wells according to the well pattern to perform an integrated exploitation for the shale and the adjacent oil reservoirs, according to the total number of perforation clusters of gas injection wells, the number of perforation clusters corresponding to each of the adjacent oil reservoirs, the gas injection amount per unit time of each of the perforation clusters, and the total gas injection amount per unit time of the gas injection wells.

2. The method according to claim 1, wherein,
    the shale satisfies a first preset condition that: a kerogen type of the shale is one or a combination of a type I and a type II, a total organic carbon content (TOC) is greater than 6%, and a vitrinite reflectance (Ro) is less than 0.95%;
    the shale satisfies a second preset condition that:
    a thickness of continuous shale with kerogen type, TOC and Ro satisfying the first preset condition is greater than 8 m; or,
    a thickness of a single reservoir of shale with kerogen type, TOC and Ro satisfying the first preset condition is greater than 3 m, a thickness of a section not satisfying the first preset condition between the shales is less than 1 m, and a cumulative thickness of the shales satisfying the first preset condition is greater than 10 m; or,
    a cumulative thickness of the shales with kerogen type, TOC and Ro satisfying the first preset condition is greater than 8 m, and a ratio of the cumulative thickness of the shales satisfying the first preset condition to a thickness of a formation where the shales are located is more than 80%; and
    the adjacent oil reservoirs satisfy a third preset condition that: an porosity of the adjacent oil reservoirs is greater than a porosity lower limit, a permeability of the adjacent oil reservoirs is greater than a permeability lower limit, and an oil saturation of the adjacent oil reservoirs is greater than an oil saturation lower limit.

3. The method according to claim 1, wherein determining the maximum seepage radius of each of the adjacent oil reservoirs based on the formation pressure, the fracture pressure and the starting pressure gradient for starting fluid seep of the adjacent oil reservoir comprises:
    determining the maximum seepage radius of the adjacent oil reservoir according to the following equation:

$$R=(P_b-P_f)/G;$$

wherein, R denotes the maximum seepage radius; $P_b$ denotes the fracture pressure of a reservoir where the oil reservoir is located; $P_f$ denotes the formation pressure of the reservoir where the oil reservoir is located; and G denotes the starting pressure gradient of the reservoir where the oil reservoir is located.

4. The method according to claim 1, wherein determining the well pattern for integrated exploitation of the shale and the adjacent oil reservoirs based on the thickness of the shale, the top boundary, the bottom boundary and the maximum seepage radius comprises:
    determining a well distance between the gas injection wells and production wells in an oil reservoir based on the maximum seepage radius of a reservoir where the oil reservoir is located,
    wherein the well distance between the gas injection wells and the production wells in the oil reservoir is less than or equal to the maximum seepage radius.

5. The method according to claim 1, wherein determining the well pattern for integrated exploitation of the shale and the adjacent oil reservoirs based on the thickness of the shale, the top boundary, the bottom boundary and the maximum seepage radius comprises:

adopting a fluctuating horizontal well pattern for production wells and the gas injection wells for the adjacent oil reservoirs, when a first distance between the shale and the top boundary or a second distance between the shale and the bottom boundary is less than or equal to a vertical fluctuation distance of the fluctuating horizontal well, or a first distance top boundary oil reservoir accounts for 30% or lower, or a second distance bottom boundary oil reservoir accounts for 30% or lower, wherein a fluctuation period of a well trajectory of the fluctuating horizontal well is less than or equal to four times of the maximum seepage radius of a reservoir where the oil reservoir is located;

wherein the vertical fluctuation distance of the fluctuating horizontal well is a fluctuation range of the fluctuating horizontal well in a vertical direction;

the first distance top boundary oil reservoir accounts for 30% or lower refers to that thicknesses of adjacent oil reservoirs between a top boundary of the vertical fluctuation distance above the shale and the top boundary accounts for 30% or lower of thicknesses of adjacent oil reservoirs within the first distance; and the second distance bottom boundary oil reservoir accounts for 30% or lower refers to that thicknesses of adjacent oil reservoirs between a bottom boundary of the vertical fluctuation distance below the shale and the bottom boundary accounts for 30% or lower of thicknesses of adjacent oil reservoirs within the second distance.

6. The method according to claim 5, wherein N+1.5 times of a distance between horizontal production wells for an shale section is used as a basis for designing a well spacing trajectory of the gas injection wells for the oil reservoir, which are fluctuating horizontal wells, N being an integer.

7. The method according to claim 5, wherein the fluctuating horizontal well pattern for the adjacent oil reservoirs comprises a first well pattern and a second well pattern, wherein the first well pattern is a well pattern in which the gas injection wells are parallel to well trajectories of the production wells for the oil reservoir, the second well pattern is a well pattern in which the gas injection wells cross perpendicularly to well trajectories of the production wells for the adjacent oil reservoirs, and in the first well pattern and the second well pattern, the gas injection wells are parallel to planar projections of well trajectories of heating wells for the shale.

8. The method according to claim 7, wherein in the first well pattern, planar projections of the gas injection wells are parallel to planar projections of the well trajectories of the heating wells for the shale, and in a direction along a well trajectory of a horizontal well, a fluctuation period of a fluctuating horizontal production well for the adjacent oil reservoirs is consistent with a fluctuation period of the gas injection wells, but in a mirror reversal relationship.

9. The method according to claim 7, wherein in the second well pattern, planar projections of the gas injection wells are perpendicular to planar projections of well trajectories of the heating wells for a shale section, the fluctuation period of the gas injection wells is the same as the fluctuation period of the fluctuating horizontal wells for the adjacent oil reservoirs, well trajectories of adjacent gas injection wells are in a mirror reversal relationship, planar projections of horizontal production wells for the adjacent oil reservoirs cross perpendicularly to planar projections of the heating wells for the shale section, a fluctuation period of the horizontal production wells for the adjacent oil reservoirs is consistent with a well spacing of the gas injection wells, planar projections of well trajectories of the fluctuating horizontal production wells for the adjacent oil reservoirs and planar projections of the gas injection wells are in a mirror reversal relation with respect to a middle section of the oil reservoir.

10. The method according to claim 1, wherein determining the well pattern for integrated exploitation of the shale and the adjacent oil reservoirs based on the thickness of the shale, the top boundary, the bottom boundary and the maximum seepage radius comprises:

using a vertical well pattern for the production wells and the gas injection wells for the adjacent oil reservoirs, when a first distance between the shale and the top boundary or a second distance between the shale and the bottom boundary is greater than a vertical fluctuation distance of the fluctuating horizontal wells, and a first distance top boundary oil reservoir accounts for 30% or higher or a second distance bottom boundary oil reservoir accounts for 30% or higher; and using a quasi-five-point vertical well pattern for the production wells for the shale and the production wells for the adjacent oil reservoirs, when the vertical well pattern is adopted for the production wells and the gas injection wells for the adjacent oil reservoirs, wherein the quasi-five-point vertical well pattern is a well pattern in which four production wells for the shale form a first rectangle or square, and the production well for the adjacent oil reservoirs is located in a center of the first rectangle or square; or, four production wells for the adjacent oil reservoirs form a second rectangle or square, and the production well for a shale section is located in a center of the second rectangle or square;

wherein the vertical fluctuation distance of the fluctuating horizontal well is a fluctuation range of the fluctuating horizontal well in a vertical direction;

the first distance top boundary oil reservoir accounts for 30% or higher refers to that thicknesses of adjacent oil reservoirs between a top boundary of the vertical fluctuation distance above the shale and the top boundary accounts for 30% or higher of thicknesses of adjacent oil reservoirs within the first distance; and the second distance bottom boundary oil reservoir accounts for 30% or higher refers to that thicknesses of adjacent oil reservoirs between a bottom boundary of the vertical fluctuation distance below the shale and the bottom boundary accounts for 30% or higher of thicknesses of adjacent oil reservoirs within the second distance.

11. The method according to claim 1, wherein determining the well pattern for integrated exploitation of the shale and the adjacent oil reservoirs based on the thickness of the shale, the top boundary, the bottom boundary and the maximum seepage radius comprises:

using a vertical well pattern for heating wells and production wells for the shale, and using a vertical well pattern for both the production wells and the gas injection wells for the adjacent oil reservoirs, when the thickness of the shale is greater than 100 m; and using a horizontal well pattern for heating wells for the shale, and using a fluctuating horizontal well pattern or a vertical well pattern for the gas injection wells and the production wells for the adjacent oil reservoirs, when the thickness of the shale is less than 100 m.

12. The method according to claim 1, wherein determining the well completion approach according to the well pattern for integrated exploitation comprises:

using a screen pipe completion for both the gas injection wells and the production wells for the adjacent oil reservoirs, when an average permeability range among the adjacent oil reservoirs is less than or equal to 3, and there is no water layer between a shale section and the top boundary of the adjacent oil reservoirs and between the shale section and the bottom boundary of the adjacent oil reservoirs;

wherein when a fluctuating horizontal well pattern is adopted for the gas injection wells and the production wells for the adjacent oil reservoirs, a well section of the gas injection wells that adopts the screen pipe completion is a whole well section of the gas injection wells entering into the shale; and a well section of the production wells for the adjacent oil reservoirs that adopts the screen pipe completion is a whole well section entering into the adjacent oil reservoir;

wherein when a vertical well pattern is adopted for the production wells for the shale and the production wells for the adjacent oil reservoirs, a screen pipe well section extends from the top boundary of the oil reservoir to the bottom boundary of the shale in a case that there is only an oil reservoir above the shale section;

the screen pipe well section extends from a top boundary of the shale to the bottom boundary of the oil reservoir in the case that there is only an oil reservoir below the shale; and the screen pipe well section extends from the top boundary of the oil reservoir above the shale to the bottom boundary of the oil reservoir below the shale in the case that there are oil reservoirs above and below the shale.

13. The method according to claim 1, wherein determining the well completion approach according to the well pattern for integrated exploitation comprises:

adopting a casing completion for both the gas injection wells and the production wells for the adjacent oil reservoirs, when an average permeability range among the adjacent oil reservoirs is greater than 3, or there are water layers between a shale section and the top boundary of the adjacent oil reservoirs and between the shale section and the bottom boundary of the adjacent oil reservoirs;

wherein when a fluctuating horizontal well pattern is adopted for the gas injection wells and the production wells for the adjacent oil reservoirs, a well section of the gas injection wells that adopts the casing completion is a whole well section of the gas injection wells entering into the shale; and a well section of the production wells for the adjacent oil reservoirs that adopts the casing completion is a whole well section entering into the adjacent oil reservoir; and when a vertical well pattern is adopted for the production wells for the shale section and the production wells for the adjacent oil reservoirs:

a bottom boundary of a casing well section is a bottom boundary of the shale in a case that there is only an oil reservoir above the shale;

the bottom boundary of the casing well section is a bottom boundary of the oil reservoir in the case that there is only an oil reservoir below the shale; and the bottom boundary of the casing well section is the bottom boundary of the oil reservoir below the shale in the case that there are oil reservoirs above and below the shale.

14. The method according to claim 1, wherein determining the total number of perforation clusters of gas injection wells, the number of perforation clusters corresponding to each of the adjacent oil reservoirs, the gas injection amount per unit time of each of the perforation clusters, and the total gas injection amount per unit time of the gas injection wells according to the well completion approach comprises:

determining, in a case that a casing completion is adopted, a reservoir space volume of the oil reservoir and a subsurface volume of accumulated injected gas in the oil reservoir within a control range of a gas injection section of the gas injection wells, according to a principle of determining a casing perforation density and a total number of perforations of the gas injection wells in the adjacent oil reservoirs above and below the shale;

determining the number of perforation clusters corresponding to each of the adjacent oil reservoirs in the casing completion, based on the reservoir space volume of the oil reservoir and the subsurface volume of the accumulated injected gas of the oil reservoir within the control range of the gas injection section of the gas injection wells; and determining the total number of perforation clusters and the total gas injection amount of the gas injection wells based on the number of perforation clusters corresponding to each of the adjacent oil reservoirs in the casing completion.

15. The method according to claim 14, wherein determining, in the case that the casing completion is adopted, the reservoir space volume of the oil reservoir and the subsurface volume of accumulated injected gas in the oil reservoir within the control range of the gas injection section of the gas injection wells according to the principle of determining the casing perforation density and the total number of perforations of the gas injection wells in the adjacent oil reservoirs above and below the shale comprises:

determining the reservoir space volume of the oil reservoir and the subsurface volume of the accumulated injected gas of the oil reservoir within the control range of the gas injection section of the gas injection wells according to the following equation:

$$V_{injection}/V_{oil\_por} \approx 2;$$

wherein, $V_{injection}$ denotes the subsurface volume of the accumulated injected gas of the oil reservoir; and $V_{oil\_por}$ denotes the reservoir space volume of the oil reservoir within the control of the gas injection section of the gas injection well;

$$\text{wherein, } V_{oil\_por} = H_e \times A_e \times \varphi_e;$$

$H_e$ denotes a thickness of the oil reservoir; $A_e$ denotes an area of the oil reservoir under the control of the gas injection section of the gas injection well; and $\varphi_e$ denotes reservoir porosity of the oil reservoir in the area of the oil reservoir within the control range of the gas injection section of the gas injection well.

16. The method according to claim 14, wherein determining the number of perforation clusters corresponding to each of the adjacent oil reservoirs in the casing completion according to the reservoir space volume of the oil reservoir and the subsurface volume of the accumulated injected gas of the oil reservoir within the control range of the gas injection section of the gas injection wells comprises:

determining the number of perforation clusters corresponding to each of the adjacent oil reservoirs in the casing completion according to the following equation:

$$(v_i \times PN_i) \bigg/ \sum_{i=1}^{n}(v_i \times PN_i) = (V_{oil\_por\_i}) \bigg/ \sum_{i=1}^{n} V_{oil\_por\_i};$$

wherein, $v_i$ denotes a gas injection amount per unit time of each perforation cluster in the ith reservoir, under a difference pressure between the fracture pressure and the formation pressure of the adjacent oil reservoirs; $PN_i$ denotes the number of perforation clusters of the gas injection wells corresponding to the ith oil reservoir; and $V_{oil\_por\_i}$ denotes the reservoir space volume of the ith oil reservoir;

wherein the gas injection amount per unit time of each perforation cluster in the ith reservoir is determined by:

$$v_i = \frac{K_{r\_Lg\_i}}{\mu_{Lg\_i}}(\Delta p_i - G_i \times R_i);$$

$K_{r\_Lg\_i}$ denotes a fluid relative permeability of the ith oil reservoir; $\mu_{Lg\_i}$ denotes a fluid viscosity of the ith oil reservoir; $\Delta p_i$ denotes a difference between the formation pressure and the gas injection pressure of the ith oil reservoir; $R_i$ denotes a seepage radius of a well-controlled perforation section of the ith oil reservoir; and $G_i$ denotes the starting pressure gradient of a reservoir where the ith oil reservoir is located.

17. The method according to claim 14, wherein determining the total number of perforation clusters and the total gas injection amount of the gas injection wells based on the number of perforation clusters corresponding to each of the adjacent oil reservoirs in the casing completion comprises:
determining the total number of perforation clusters and the total gas injection amount of the gas injection wells according to the fallowing equation:

$$Q_{inj\_gas} = \sum_{i=1}^{n}(v_i \times PN_i);$$

wherein, $Q_{inj\_gas}$ donates the total gas injection amount per time unit of the gas injection wells under a difference pressure between the fracture pressure and the formation pressure of the adjacent oil reservoirs; $V_i$ denotes the gas injection amount per unit time of each perforation cluster in the ith reservoir, under a difference pressure between the fracture pressure and the formation pressure of the adjacent oil reservoirs; and $PN_i$ denotes the number of perforation clusters of the gas injection wells corresponding to the ith oil reservoir.

18. The method according to claim 1, wherein determining the well completion approach according to the well pattern for integrated exploitation, and determining the total number of perforation clusters of the gas injection wells, the number of perforation clusters corresponding to each of the adjacent oil reservoirs, the gas injection amount per unit time of each perforation cluster, and the total gas injection amount per unit time of the gas injection wells according to the well completion approach is accomplished in conditions that:
a well completion of the production wells for the adjacent oil reservoirs is prior to heating of the shale section;
when a fluctuating horizontal well exploitation approach is adopted, an upper sealing mode of the gas injection well section is adopted for the gas injection wells during the well completion;
when a casing completion is adopted for the production wells for the adjacent oil reservoirs, a complete perforation mode is adopted for the oil reservoir; and
when the casing completion is adopted for the production wells for the adjacent oil reservoirs, a perforation section avoids any water layer.

19. An apparatus for determining an integrated exploitation approach for a shale and adjacent oil reservoirs comprising a memory, a processor and a computer program stored in the memory and executable by the processor, wherein the processor is configured to implement, when executing the computer program, the method for determining an integrated exploitation approach for a shale and adjacent oil reservoirs comprising:
collecting logging data of a target reservoir of interest comprising the shale and adjacent oil reservoirs by a logging instrument and determining a thickness of the shale, thicknesses of the adjacent oil reservoirs to the shale, and a planar distribution area of the shale and the adjacent oil reservoirs;
determining a top boundary of the adjacent oil reservoir above the shale, and a bottom boundary of the adjacent oil reservoir below the shale, based on the thickness of the shale, the thicknesses of the adjacent oil reservoirs, and the planar distribution area of the shale and the adjacent oil reservoirs;
acquiring a formation pressure, a fracture pressure and a starting pressure gradient for starting fluid seep of the adjacent oil reservoirs, and determining a maximum seepage radius of each of the adjacent oil reservoirs based on the formation pressure, the fracture pressure and the starting pressure gradient that are acquired;
determining a well pattern for integrated exploitation of the shale and the adjacent oil reservoirs, and using a fluctuating horizontal well or a vertical well to bore through the shale and the adjacent oil reservoirs, based on the thickness of the shale, the top boundary, the bottom boundary and the maximum seepage radius;
determining a well completion approach according to the well pattern for integrated exploitation;
determining a total number of perforation clusters of gas injection wells, a number of perforation clusters corresponding to each of the adjacent oil reservoirs, a gas injection amount per unit time of each of the perforation clusters, and a total gas injection amount per unit time of the gas injection wells, according to the well completion approach; and
using production wells and gas injection wells according to the well pattern to perform an integrated exploitation for the shale and the adjacent oil reservoirs, according to the total number of perforation clusters of gas injection wells, the number of perforation clusters corresponding to each of the adjacent oil reservoirs, the gas injection amount per unit time of each of the perforation clusters, and the total gas injection amount per unit time of the gas injection wells.

20. A non-transitory computer-readable storage medium storing therein a computer program for performing the method for determining an integrated exploitation approach for a shale and adjacent oil reservoirs comprising:
collecting logging data of a target reservoir of interest comprising the shale and adjacent oil reservoirs by a logging instrument and determining a thickness of the shale, thicknesses of the adjacent oil reservoirs to the shale, and a planar distribution area of the shale and the adjacent oil reservoirs;

determining a top boundary of the adjacent oil reservoir above the shale, and a bottom boundary of the adjacent oil reservoir below the shale, based on the thickness of the shale, the thicknesses of the adjacent oil reservoirs, and the planar distribution area of the shale and the adjacent oil reservoirs;

acquiring a formation pressure, a fracture pressure and a starting pressure gradient for starting fluid seep of the adjacent oil reservoirs, and determining a maximum seepage radius of each of the adjacent oil reservoirs based on the formation pressure, the fracture pressure and the starting pressure gradient that are acquired;

determining a well pattern for integrated exploitation of the shale and the adjacent oil reservoirs, and using a fluctuating horizontal well or a vertical well to bore through the shale and the adjacent oil reservoirs, based on the thickness of the shale, the top effective boundary, the bottom boundary and the maximum seepage radius;

determining a well completion approach according to the well pattern for integrated exploitation;

determining a total number of perforation clusters of gas injection wells, a number of perforation clusters corresponding to each of the adjacent oil reservoirs, a gas injection amount per unit time of each of the perforation clusters, and a total gas injection amount per unit time of the gas injection wells, according to the well completion approach; and using production wells and gas injection wells according to the well pattern to perform an integrated exploitation for the shale and the adjacent oil reservoirs, according to the total number of perforation clusters of gas injection wells, the number of perforation clusters corresponding to each of the adjacent oil reservoirs, the gas injection amount per unit time of each of the perforation clusters, and the total gas injection amount per unit time of the gas injection wells.

* * * * *